(12) United States Patent
Hetzel et al.

(10) Patent No.: US 7,701,959 B2
(45) Date of Patent: Apr. 20, 2010

(54) DISTRIBUTED NETWORK SYSTEM WITH HIERARCHICAL MANAGEMENT OF RESOURCES

(75) Inventors: Herbert Hetzel, Schweigen-Rechtenbach (DE); Rainer Klos, Ettlingen-Oberweier (DE); Martin Miller, Karlsruhe (DE)

(73) Assignee: SMSC Europe GmbH, Karlsruhe (DE)

( * ) Notice: Subject to any disclaimer, the term of this patent is extended or adjusted under 35 U.S.C. 154(b) by 282 days.

(21) Appl. No.: 11/831,388

(22) Filed: Jul. 31, 2007

(65) Prior Publication Data

US 2008/0037571 A1 Feb. 14, 2008

Related U.S. Application Data

(63) Continuation of application No. PCT/EP2006/001677, filed on Feb. 23, 2006.

(51) Int. Cl.
*H04L 12/40* (2006.01)
*H04B 7/212* (2006.01)
(52) U.S. Cl. ..................... 370/439; 370/444
(58) Field of Classification Search ............... None
See application file for complete search history.

(56) References Cited

U.S. PATENT DOCUMENTS 6,052,750 A * 4/2000 Lea .................. 710/72
6,452,935 B1 * 9/2002 Gibbs ................ 370/439
7,346,920 B2 * 3/2008 Lamkin et al. ........... 725/112
2004/0081200 A1 4/2004 Vollmer et al.
2004/0116141 A1 * 6/2004 Loven et al. ............. 455/519

FOREIGN PATENT DOCUMENTS

EP 1044536 10/2000

OTHER PUBLICATIONS

International Search Report, PCT/EP2006/001677, mailed Jun. 29, 2006.
Lea et al., "Networking Home Entertainment Devices with HAVi," Computer, vol. 33, No. 9, Sep. 2000, pp. 35-43.

* cited by examiner

*Primary Examiner*—Hong Cho
*Assistant Examiner*—Eunsook Choi
(74) *Attorney, Agent, or Firm*—Kevin L. Daffer; Daffer McDaniel, LLP

(57) ABSTRACT

Network devices of a digital network for communication between a plurality of devices have a source for transmitting data into the network, and sinks for receiving data from the network. Managers (logical controllers) to which priorities are assigned in a hierarchical order manage connections between sources and sinks. Before setting up a connection, a manager first queries a negotiation administrator to obtain a right to negotiate with other managers and to set up connections. When all other managers having higher priorities also have granted the connection, the manager connects sources and sinks.

28 Claims, 34 Drawing Sheets

DISTRIBUTED NETWORK SYSTEM WITH HIERARCHICAL MANAGEMENT OF RESOURCES

This application is based on pending International Application No. PCT/EP2006/001677 filed Feb. 23, 2006, which designated the United States and claims priority to European Patent Application No. 05004058.3 filed Feb. 24, 2005 (now abandoned) and pending European Patent Application No. 06707221.5 filed Feb. 23, 2006.

BACKGROUND OF THE INVENTION

1. Field of the Invention

The invention relates to a distributed network system for connecting a broad variety of electronic devices in a house with a common network.

2. Description of the Related Art

In modern multi-media networks for homes, several devices are connected together. Such devices can be complex multimedia devices like TV sets or DVD players. They can also be less complex devices like temperature controllers, or even very simple devices like jalousie actuators or light switches. All these devices are connected together via a common network.

A common standard for multi-media networks is the HAVI Standard. A home network based on this Standard is disclosed in EP 1044536. This Standard describes different nodes with different capabilities, from simple "base nodes" to complex "full nodes." A disadvantage is that even the relatively simple "base nodes" require complex and expensive interface hardware for communicating with other nodes. Furthermore, there is no satisfactory mechanism for resolution of resource conflicts as described in the following scenario: a first home inhabitant is listening to music in the bathroom, in the kitchen is another person who uses the intercom to call the bathroom, during this conversation a phone call arrives. There are now three applications: music, intercom, and phone which require access to loudspeakers in the bathroom. Now the applications affect each other—the music application is affected by the intercom application, and both are affected by the phone application.

The resource conflict can be resolved only by a "full AV node" which can act as a master controller, e.g. a central resource manager. Therefore a very complex central controller is required.

In the example of a home, we may expect the intercom to be from a different manufacturer than the DVD player. Furthermore, the DVD player may have been added to the network at a later time after installation of the network. This leads to the problem of how the applications can interact with each other in a sensible way, when they were unknown to each other at construction time. A solution provided in EP 1044536 uses an intelligent update method for updating the system by retrieving updated software. Often an import of software cannot be accepted for reliability and stability reasons, or simply because some devices are not updateable. Furthermore, an intelligent updating mechanism requires at least one complex "full node."

BRIEF SUMMARY OF THE INVENTION

The invention is based on the problem of providing a network system which can connect a broad variety of different electronic devices, can provide full plug and play functionality, work without any central units, and can be easily implemented within devices, therefore requiring only a small amount of memory and CPU power. Furthermore, it should be compatible with the MOST Standard.

In accordance with the invention, this problem is solved by a digital network for communication between a plurality of devices, comprising: at least one device having a source for transmitting data into the network; at least one device having a sink for receiving data from the network; and at least one device having an application for at least one of communicating with and controlling any other device or application; in which data is transferred from sources to sinks only by means of connections between sources and sinks; wherein at least one application has a manager for management of devices, the manager being configured for: selecting at least one source and at least one sink to be connected; and connecting at least one selected source to at least one selected sink; all managers have assigned priorities; and at least one manager is configured for negotiating with other managers having a higher priority and requesting a right to specifically connect selected sources and sinks, and for limiting a selection of sources and sinks specifically to sources and sinks for which a connection has been granted by the other managers having a higher priority, before connecting at least one selected source to at least one selected sink, or controlling at least one selected source or at least one selected sink.

In accordance with the invention, this problem is also solved by a method for freeing network resources required for establishing a new connection between a data source and a data sink in a decentralized digital network for communication between a plurality of devices, the network comprising: at least one device having a source for transmitting data into the network; at least one device having a sink for receiving data from the network; connections for data transfer between sources and sinks; device managers which each have an assigned priority and are interconnected along a priority chain, for selecting, connecting, and controlling specific sources and sinks for which an establishment of a connection has been granted by other managers having a higher priority; the method comprising the steps of: selecting a device manager to establish a new connection between a source and a sink, and using the selected manager as a calling manager to send first to a manager of lowest priority in the priority chain a freeing request for required network resources, in case the selected device manager does not have resources necessary for establishing the new connection, the freeing request containing a "don't free parts" flag telling receiving managers not to free any resources in case they cannot grant all requested resources; using a receiving manager to pass the freeing request to a receiving manager of next higher priority, in case it cannot grant all requested resources; using a receiving manner to free all requested resources and confirm availability of the resources to the calling manager, in case this receiving manager can grant all requested resources; using a receiving manager to enter details of a partial amount that this manager could contribute to the requested resources in a "spread resource found" field reserved for this purpose in the freeing request, without freeing any resources, in case this receiving manager cannot grant all requested resources and the "don't free parts" flag is set, before passing the request to a receiving manager of next higher priority; using a receiving manager to remove the "don't free parts" flag from the request and to pass the request back to the receiving manager having a lowest priority, in case the total of partial amounts entered has reached 100% of an initially requested amount; using the calling manager to cancel the initially intended establishment of a connection in case the freeing request passed upwards along the priority chain returns to the calling manager and subordinate managers along the priority chain were not able to contribute a total initially requested amount of resources; using a manager receiving the freeing request with the "don't free flag" not set after it has been passed back to the manager of lowest priority to check whether a total of partial amounts entered in the "spread resource found" field minus the partial amount that this manager could contribute is above or equal to 100% of a total amount initially requested, and if it is, to pass the request to a manager of next higher priority, without freeing any resources; and using a manager receiving the freeing request with the "don't free flag" not set after it has been passed back to the manager of lowest priority to check whether a total of partial amounts entered in the "spread resource found" field minus the partial amount that this manager could contribute is above or equal to 100% of a total amount initially requested, and if it is, to pass the request to a manager of next higher priority without freeing any resources; and if it is not, to free the partial amount of resources that this manager had entered as being able to contribute, and to subtract the partial amount of freed resources from the requested amount, and to pass the request, if it is not completely fulfilled, to the manager of next higher priority along the chain.

In accordance with the invention a further solution to the above problem is provided by a manager for a digital network for communication between a plurality of devices, wherein the manager has an assigned priority and is configured for: querying for available sources for transmitting data into the network, and sinks for receiving data from the network; retrieving status information from selected devices; selecting at least one source and at least one sink to be connected; negotiating with other managers having a higher priority, and requesting the right to specifically connect selected sources and sinks; limiting a selection of sources and sinks specifically to sources and sinks for which a connection has been granted by the other managers; and connecting at least one selected source to at least one selected sink.

In accordance with the invention a further solution to the above problem is provided by a method for managing network devices in networks for communication between a plurality of devices, comprising the steps of: assigning priorities to all managers; using at least one manager to query in the network for available sources for transmitting data into the network, and sinks for receiving data from the network; using at least one manager to retrieve status information from selected devices; using one or a plurality of managers to select at least one source and at least one sink to be connected; using one or a plurality of managers to connect at least one selected source to at least one selected sink; using at least one manager to negotiate with other managers having a higher priority and to request the right to connect specifically selected sources and sinks; using at least one manager to limit the selection of sources and sinks specifically to sources and sinks for which a connection has been granted by at least one negotiation administrator; and using at least one manager to connect at least one selected source to at least one selected sink.

BRIEF DESCRIPTION OF THE DRAWINGS

The invention will be described in the following by exemplary embodiments without any restriction of the general inventive idea, and with reference to the drawings in which:

FIG. 47 shows how the insertion of a device can change the relationship between devices.

DETAILED DESCRIPTION OF PREFERRED EMBODIMENTS

The invention relates to a network comprising components for hierarchical resource management, i.e. a device manager, and a method for managing resources in a network.

The invention is based on a decentralized network concept. Most applications in an inventive digital multimedia network (phone, intercom, etc.) comprise software. The applications do the following:
  (i) Query for available sources and sinks. Therefore the network needs to be scanned. From each device certain capability and status information needs to be retrieved.
  (ii) Connect sources to sinks (e.g. connect a tuner to an amplifier).
  (iii) Control sources and sinks (e.g. change a radio station with a tuner, adjust a volume with an amplifier, etc.).

Figure 3:
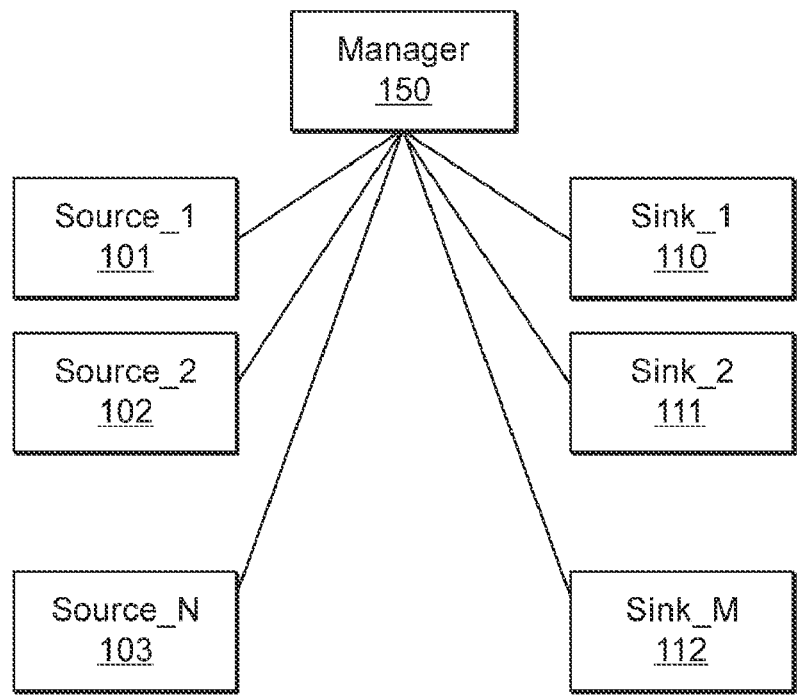
FIG. 3 shows a manager (management logic) scanning the network.

For scanning and controlling, the application needs a control channel to each source and each sink (FIG. 3).

The part of the application connecting sources and sinks is called the manager. A manager is a management logic or management control logic. Preferably a manager provides a standardized interface to an application. Each manager is responsible for its own connections. For example, a manager must not start a source streaming without having a sink to consume the stream. Also, a manager must not stop a source from streaming, if there is still a sink connected. Furthermore, connections can be established only by managers. This means that a source never starts streaming by itself, this is always initialized by a manager, and a sink never starts consuming data by itself, this is also always initialized by a manager.

The sources, sinks and the manager can be spread out over different devices, but they also can be combined in some devices or even in one device.

The introduction of managers into a system's model is the first step to make applications visible to each other. Once they can address each other, they will be able to negotiate access to shared resources.

Figure 7:
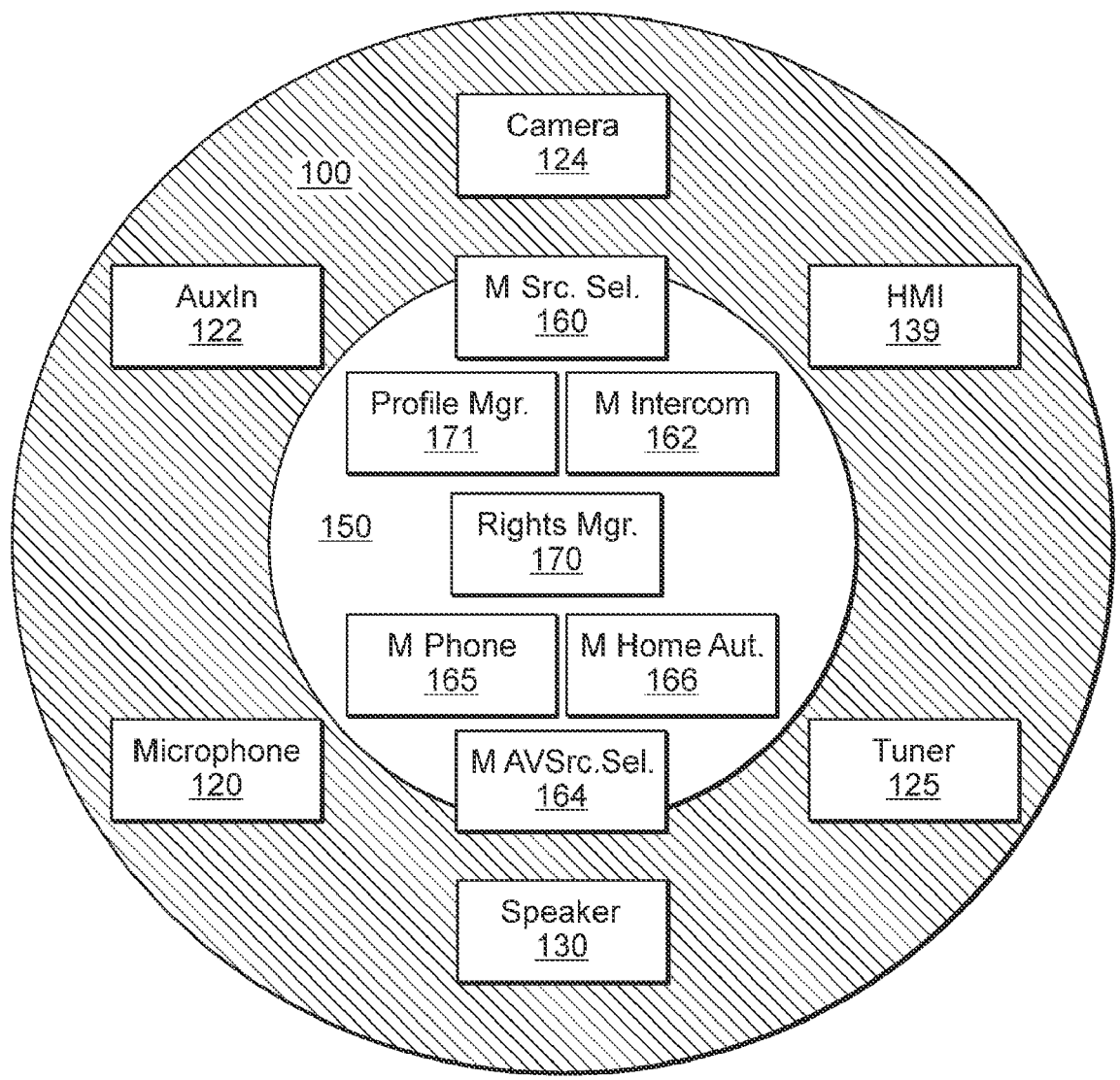
FIG. 7 shows a more complex network, where a group of managers control several sources and sinks.

In addition, at least one profiler may be provided. Furthermore, at least one, and preferably exactly one, negotiation administrator may be provided (FIG. 7). All these enhance the network functionality, although the network will also function without these devices. All these can be implemented in any device as well as in simple microcontrollers, as they do not need as much memory or as much computing power as in the case of prior art which is implemented for example on a JAVA console, or may also be implemented as software on a personal computer.

Figure 8:
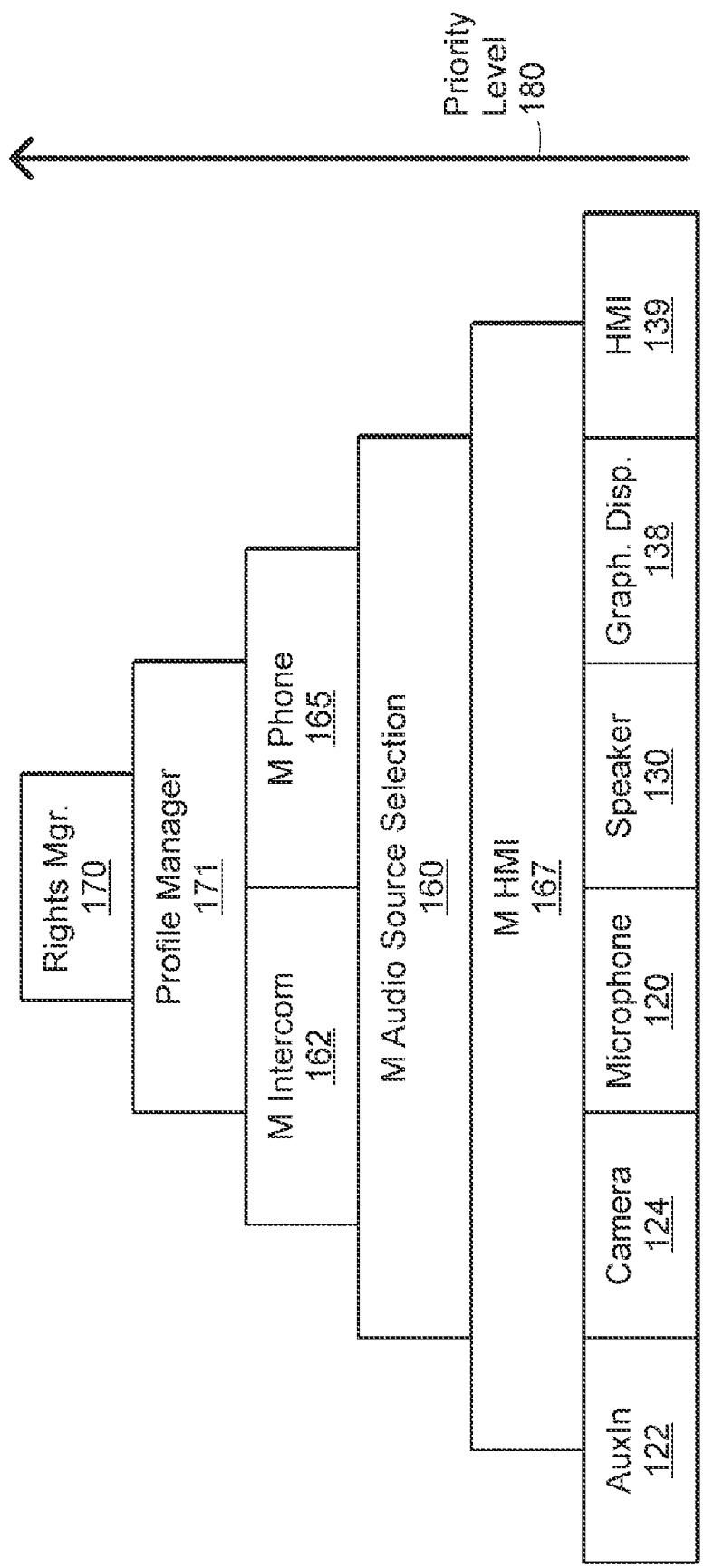
FIG. 8 shows a similar network with assigned priorities.

In another embodiment, priority levels are assigned to the managers for resolution of conflicting states. Preferably the highest priority belongs to a negotiation administrator which assigns access rights to all other managers. The negotiation administrator may be part of any manager or application. Preferably the manager having the highest priority is selected as the negotiation administrator. Lower priority levels are assigned to managers according to the importance of the applications. Even the managers of different instances of an application should have different priorities. The lowest priority levels are assigned to the devices. All managers may have the same priority (FIG. 8).

In general, any priority level may be assigned to any device and any manager, even to negotiation administrators and profilers. This allows a very detailed adjustment of the behavior of the network. For example, a fire alarm may be set higher than a negotiation administrator as described above. This permits a high priority fire alarm having immediate access to all resources.

This hierarchy model has several advantages. If a manager is taken out of the system, the order of the remaining managers does not change. Furthermore, priority levels can be changed dynamically. So the user in the bathroom could select that for the next hour the music is more important than the phone. Finally, no invalid setups are possible. This becomes very important for plug and play systems, where devices may be plugged in and the managers of which may have any priority level set.

Potential conflicts caused by managers having the same priority could be solved by assigning priorities according to the node position of a device. If there are several applications within a node, the instance ID or any other physical or logical address could be used. This mechanism should not change the basic priority order, but adjust the priority of managers previously having the same priority in relation to each other.

For adjustment, the settings may be altered by a user. After assigning a unique priority to each manager, a priority chain is obtained.

For connecting sinks to sources, managers have to follow a certain protocol. It is not allowed to connect sources directly to sinks, if there is more than one manager in a system. The preferred connection procedure comprises the following basic steps:
  A. Obtaining a right to negotiate source and sink access.
  B. Requesting a wanted set of connections from managers of higher priority.
  C. Publishing granted connections to all managers.
  D. Obtaining required network bandwidth.
  E. Establishing connections.
  F. Releasing a right to negotiate source and sink access.

These basic steps are described in detail below.

A. Obtaining a Right to Negotiate Source and Sink Access.

In a large network, two applications could simultaneously start to plan new connections between sources and sinks. A typical case would be that a phone call arrives at the same moment at which the user presses a play button on a DVD player. If now the managers of both applications start to negotiate access to the needed resources with the other available applications parallel, the result could easily become unpredictable, since the two managers could confuse each other. Therefore according to the invention, the right of negotiating access to needed resources is serialized. Under the assumption that even in large systems simultaneities will occur very seldom, and that negotiating access to sources and sinks will usually take only a few milliseconds, this is no real limitation.

In another embodiment of the invention, only one manager at a time is allowed to negotiate access to sources and sinks.

In another embodiment, if an application's manager obtains the right to negotiate access to some sources and sinks, it does not mean that the manager already obtains the right to access the sources and sinks. It means only that the manager may negotiate the access with the other installed managers which might want to use these sources and sinks on their own.

Figure 11:
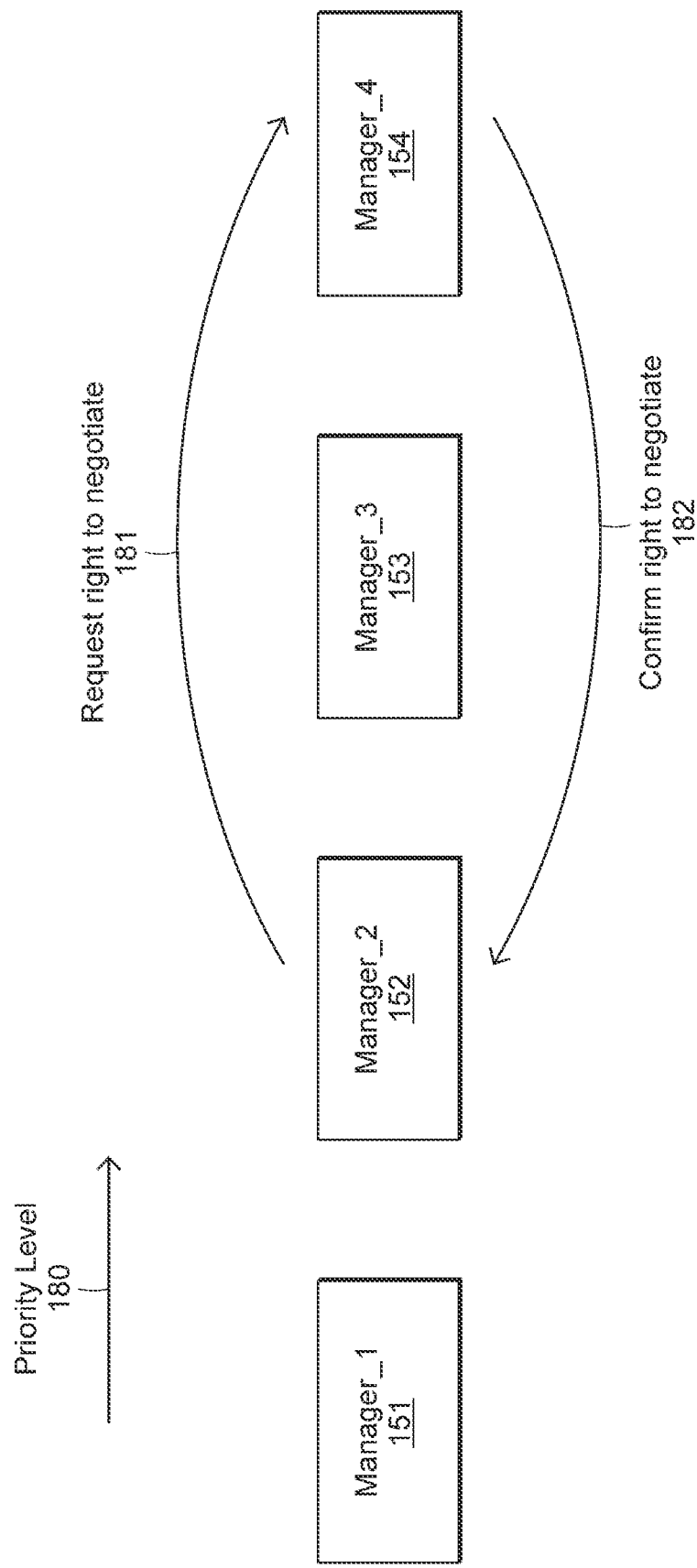
FIG. 11 shows a method for obtaining a right to negotiate source and sink access.

In a real plug and play system according to the invention, there is preferably no central point by definition (by FIG. 11). Therefore one negotiation administrator is selected from all managers. Thus, each manager should have the ability to act as the negotiation administrator, when selected.

In another embodiment, one of the network's managers has to be selected to do this job. According to the invention; this is the manager with the highest priority level. During startup each manager scans the network to find out which of the managers is the one with the highest priority level. This manager now performs the function of the negotiation administrator. If this manager is unplugged during running time, the next higher manager takes over, and so on.

In an alternative embodiment, the negotiation administrator may be a discrete physical or logical unit.

Before starting to negotiate, a manager requests the right to do this from the negotiation administrator which is the manager with the highest priority level. If this manager has already granted the right to another manager, it rejects the request. The calling manager waits for a predetermined time, preferably 20 ms, or a randomly or dynamically assigned time, then retries. If no other manager holds the right to negotiate, the calling manager is given this right.

After a manager has negotiated, it returns the right to the negotiation administrator which can then pass the right to another manager, if requested.

B. Requesting a Wanted Set of Connections from Managers of Higher Priority

Figure 12:
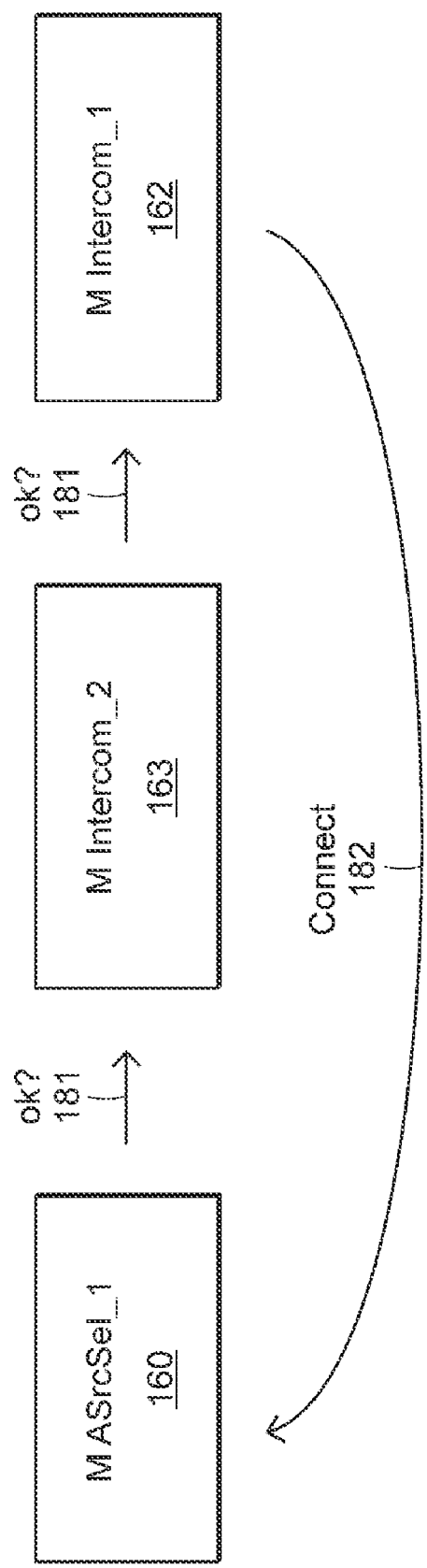
FIG. 12 shows an example of connection request procedure.

In another embodiment, an application's manager, having obtained a right to negotiate a planned set of connections, has to request these connections from managers of higher priority. Therefore it passes a connection request to a first manager of next higher priority level. If this first manager does not refuse the connection request, it passes the request to a second manager having the next higher priority level, and so on. If there is no manager of a higher level to receive the connection request, the request is passed back to the calling manager which finally obtains access to the sinks and sources and then establishes the connection (FIG. 12). This procedure is independent of the types of managers. There may be managers to be queried first, because they have the next higher priorities. A profiler, if available, may be queried later, because it has a higher priority.

Before passing a request to a manager with a next higher priority level, or back to a calling manager, any manager may modify the request. It could add or remove resources, or modify parameters. By doing this, an access to resources which are being used by an application of higher priority may be restricted or even denied (FIG. 12).

In another embodiment, a source can be routed via additional applications. This could be used to chain-in additional devices like an audio equalizer. For doing this, the source is connected to the audio equalizer's sink and the audio equalizer's source is connected to the final sink.

In another embodiment, a flag may be provided within a request, preventing modification of the request. This flag can be set by the calling manager. If a request cannot be granted without modification, it will then be refused.

Figure 13:
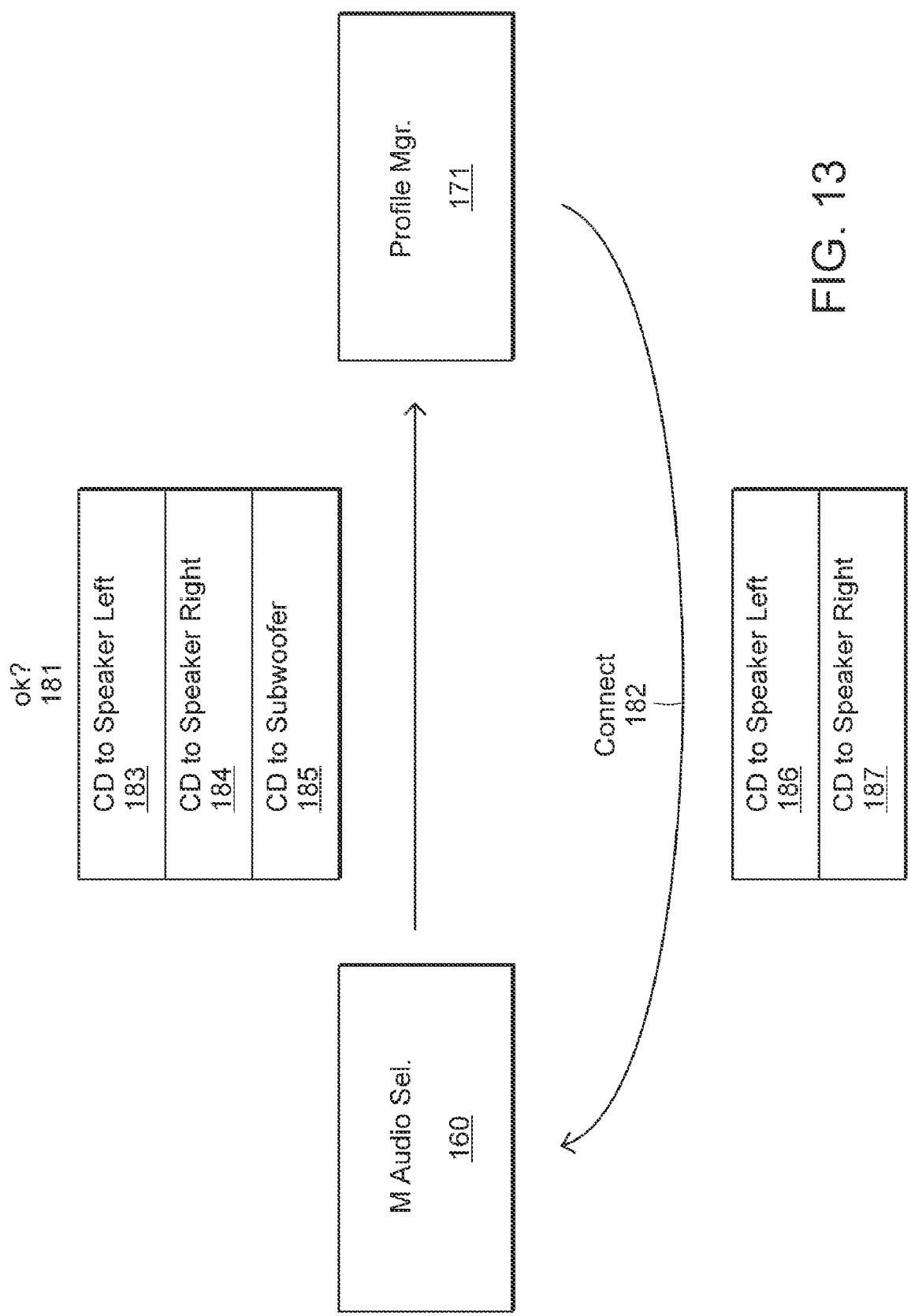
FIG. 13 shows a request modified by a profiler.

In a further embodiment, at least one profiler is provided for adapting requests according to profiles. Such profiles may be predetermined, and/or set by a user, or dynamically assigned upon configuration changes of the network or in dependence upon parameters of network devices. Profilers are also represented by a manager. Typically, profiler's managers have a high priority (FIG. 13).

In another embodiment of the invention, at least one virtual device is provided as a virtual source and/or a virtual sink. These virtual devices are generated by software to permit a connection with other real or virtual devices (as illustrated later by FIGS. 14 and 15).

C. Publishing Granted Connections to all Managers.

In order to avoid conflicts with already existing connections owned by managers of lower priorities, each granted connection is published to the managers of lower priorities. This is done by a calling manager sending a list containing the connections to the manager with the lowest priority. From there it is passed upwards along the priority chain. Managers that have set up connections themselves using the listed sources or sinks, release these connections, unless the sources or sinks accept multiple connections, before passing-on the list to a next higher manager. Once the manager of highest priority receives the published list, it tells the calling manager that publishing has been finished (as will be illustrated later by FIGS. 16 and 17).

D. Obtaining Required Network Bandwidth.

Figure 24:
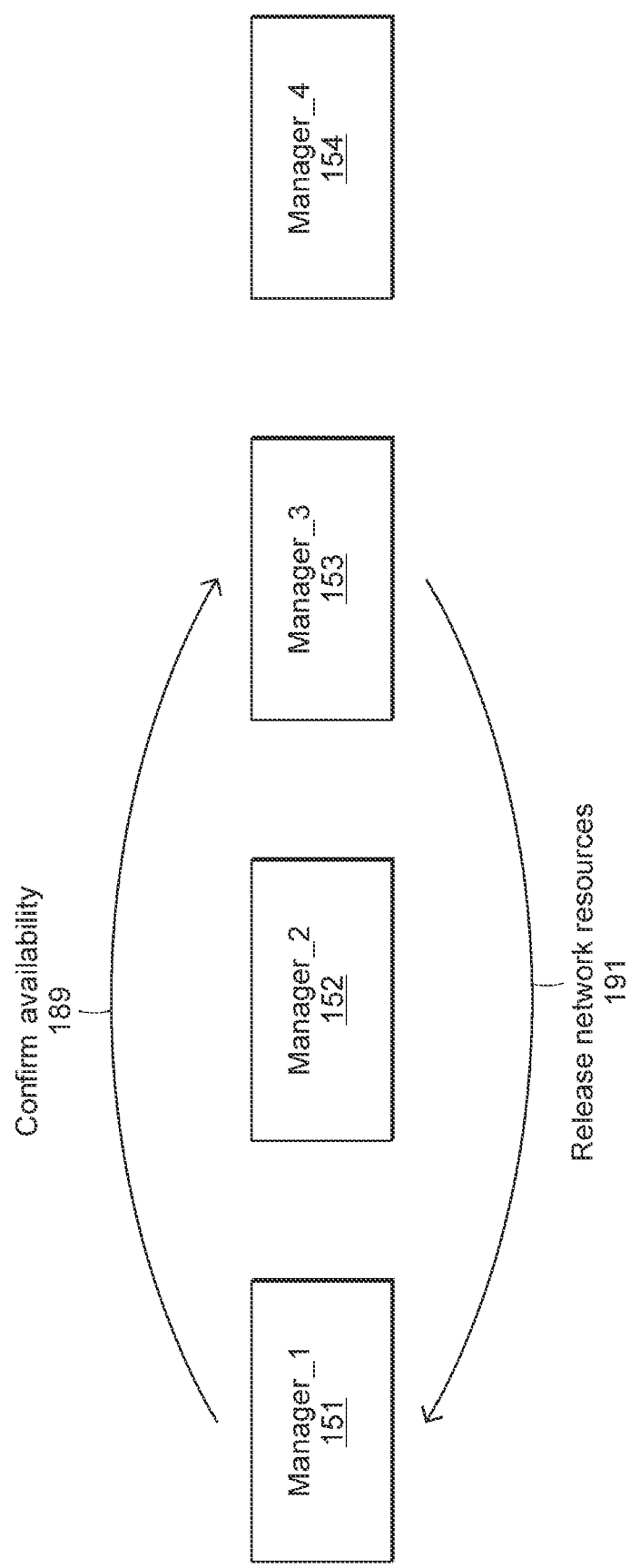
FIG. 24 shows freeing of resources.

In another preferred embodiment, means for freeing network resources are provided for allocating network bandwidth with a channel able to transmit data for a requested connection. If an application's manager cannot obtain required network resources for building a connection, it can request managers of lower priority to release their used network resources. To cause the system's manager of lowest priority to release its resources, this request is sent to the lowest manager in the priority chain. If this manager allocates these resources, it frees them and confirms the resources' availability to the calling manager (FIG. 24).

Figure 25:
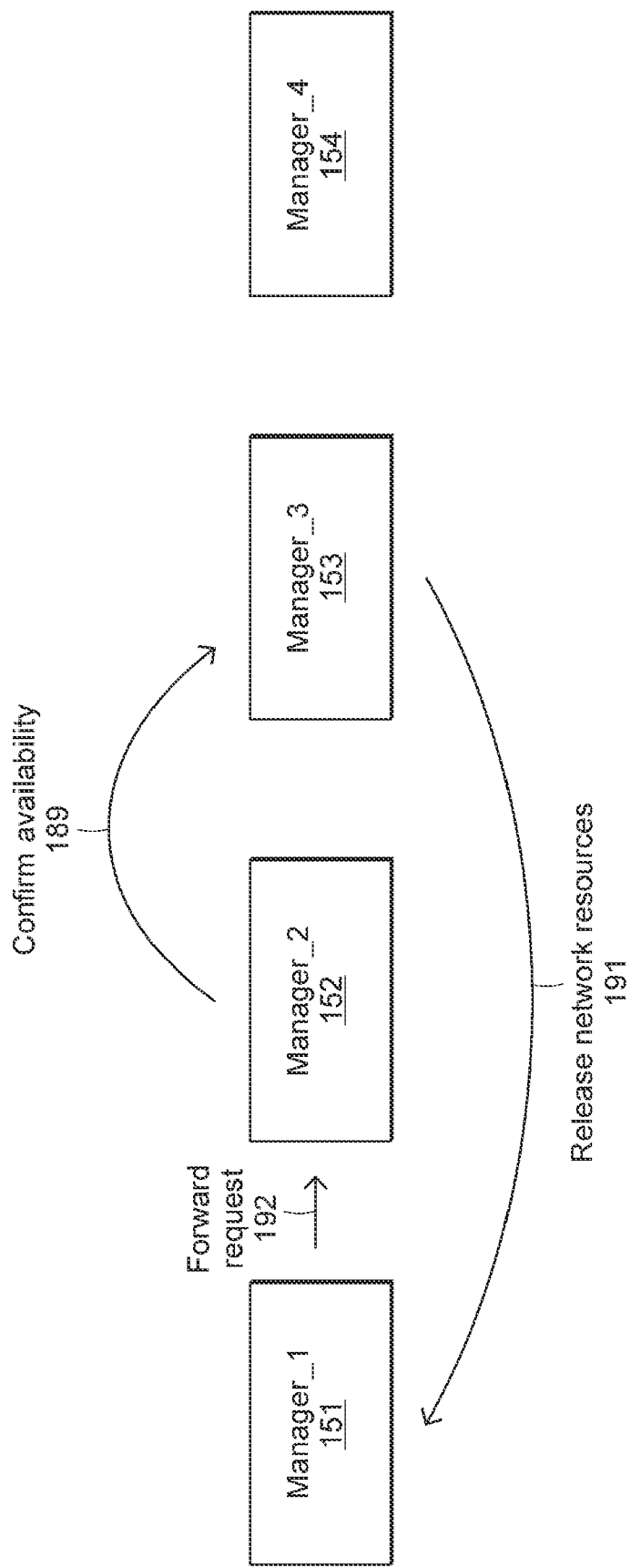
FIG. 25 shows alternative freeing of resources.
Figure 26:
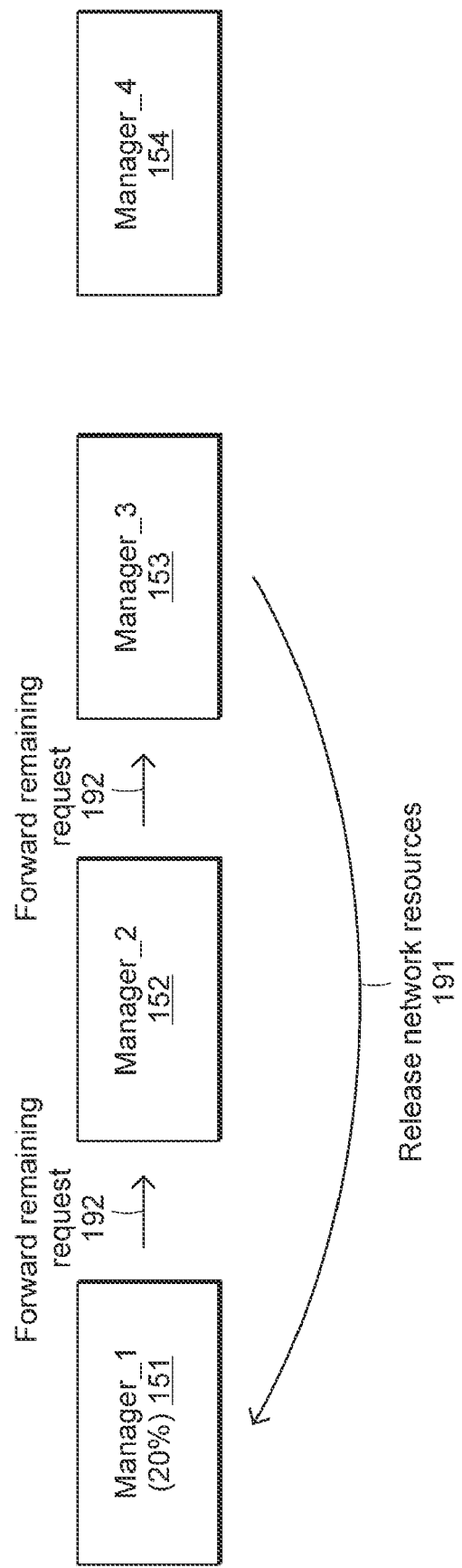
FIG. 26 shows a first strategy for freeing spread resources.
Figure 27:
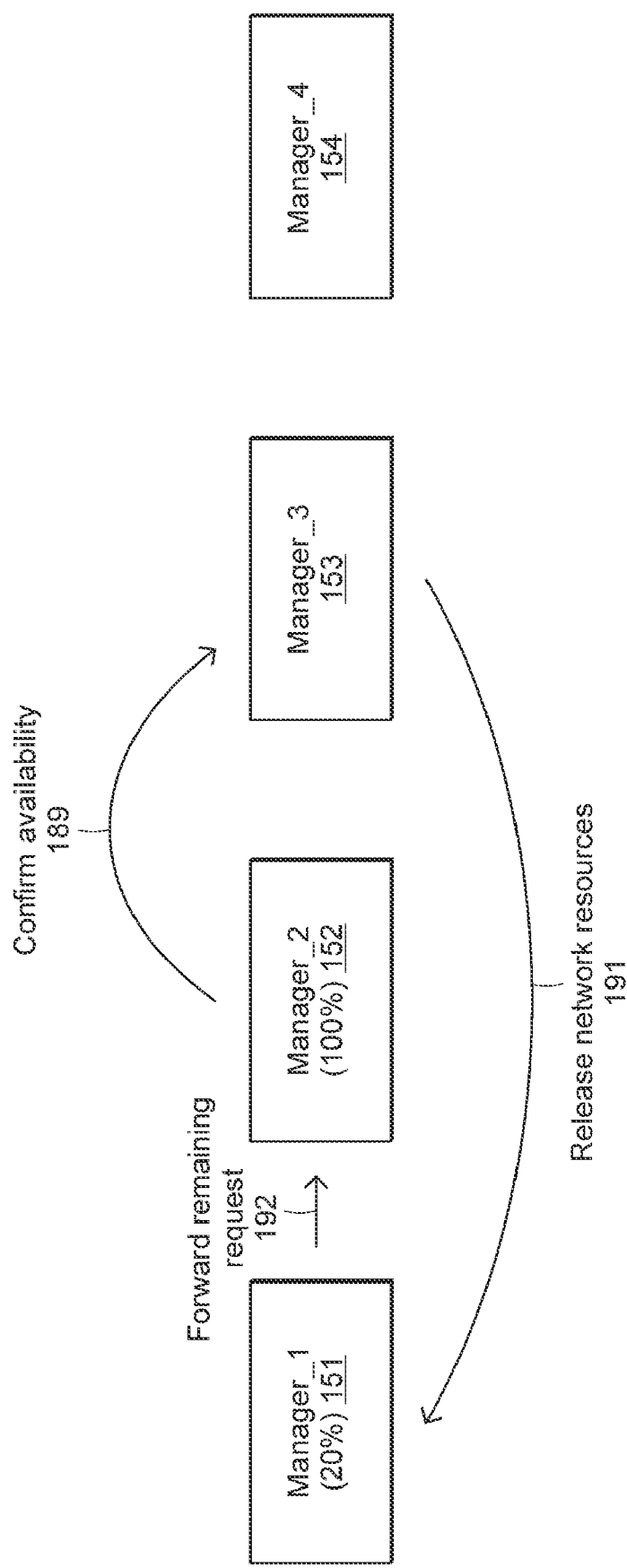
FIG. 27 shows an improved strategy for freeing spread resources.

If a device manger which has been requested to free network resources holds only a part of the requested resources, it frees as much of the requested resources as possible and then forwards the remaining request to the next manager (FIGS. 25, 26, 27). An improved method of freeing spread resources from the managers with the lowest possible priorities comprises the following steps:

(i) The calling manager sends a freeing request to the manager with the lowest priority. The freeing request contains a flag which tells managers not to free any resources, if they cannot cover the whole request.

(ii) If a manager can cover the whole request, it frees the requested resources and confirms the availability to the calling manager.

(iii) If a manager cannot cover the whole request and the "don't free parts"—flag is set, a manager adds the amount it could contribute to a field reserved for this purpose in the freeing request. If this "spread resource found" field reaches 100%, the "don't free parts" flag is removed and the request is passed back to the manager having the lowest priority.

(iv) If the request returns to the calling manager, the subordinate managers do not have the requested amount of the resource to free. Thus the calling manager has to cancel connecting.

(v) If a manager receives the freeing request without the "don't free parts" flag set, it checks whether the "spread resource found" field minus it's own part is above or equal to 100%. If it is, it passes the request upwards without freeing anything.

(vi) Otherwise, it frees the allocated resources, removes the freed part from the requested amount and passes the request upwards, if it is not completely fulfilled.

A freeing request comprises the following information fields: (a) type of resource requested to be freed; (b) amount of resource to be freed; (c) a "don't free parts" flag; (d) a "spread resource found" field; and (e) a "spread resource freed" field.

E. Establishing Connections.

According to the invention, application data is transmitted only via connections. Basic network transfer modes like asynchronous application data via Application Message Service and Packet Data Transfer, as defined for example in the MOST Standard, cannot be used directly. Sources, sinks and network bandwidth are required for setting up connections. This is a unique mechanism which is independent of type of transfer such as via asynchronous or synchronous channels. In MOST networks, for example, function blocks are defined for different types of asynchronous application data. Connections are exclusively established by resource managers, without dependence upon the type of the resources.

In a further embodiment, means for tunneling frames of a different network type are provided. In case the inventive network is based on the MOST standard, alternate frames like Ethernet or others may be tunneled through the MOST network. For this purpose, alternative network type source and sink function blocks have to be specified. A possible alternative network bridge device would contain both function blocks. Beside this, the device would contain an alternative network application. The alternative network application's manager would scan the inventive network for alternative sinks and sources and try to connect its local source to the alternative sinks, and the local sink to the alternative sources. This is more effort than merely broadcasting incoming alternative frames, but it offers several advantages: multiple separated and independent alternative networks can be built on a single inventive network. Furthermore, a rights management can be added to the system for regulating alternative network tunneling for each alternative network node.

In another embodiment, the network is configured to have at least one set of parallel connections.

In a further embodiment of the invention, at least one of the connections of the types unicast, broadcast and groupcast are supported.

The sending of application data via messages from a single source to a single sink is called unicast. If a source sends the same data in N frames to N sinks, there are N unicasts.

In a network where N nodes are connected to each other by unicast, $C_2^N$ unicast connections are required, where $$C_2^N = \frac{N!}{2(N-2)!}.$$

This number increases rapidly with increase of N. One hundred PCs would already need 4950 connections. A system would soon run into bandwidth limitations if unicast were to be used to implement the connections. In the case of a broadcast, a source sends a frame only once. The frame is then received by all connected sinks. A connection request which is passed from manager to manager can contain a broadcast address as a sink.

A groupcast is a broadcast to a group of devices. It can be of great advantage for groups to be built dynamically, as is done in TCP/IP's multicast. A good example of this advantage is obtained by imagining a single inventive network which tunnels two discrete Ethernets. In this case, each Ethernet could build its own group of transmitters/receivers. To give all Ethernet devices the same group address would not be enough. Two different group addresses are required to build two groups of Ethernet devices.

Figure 23:
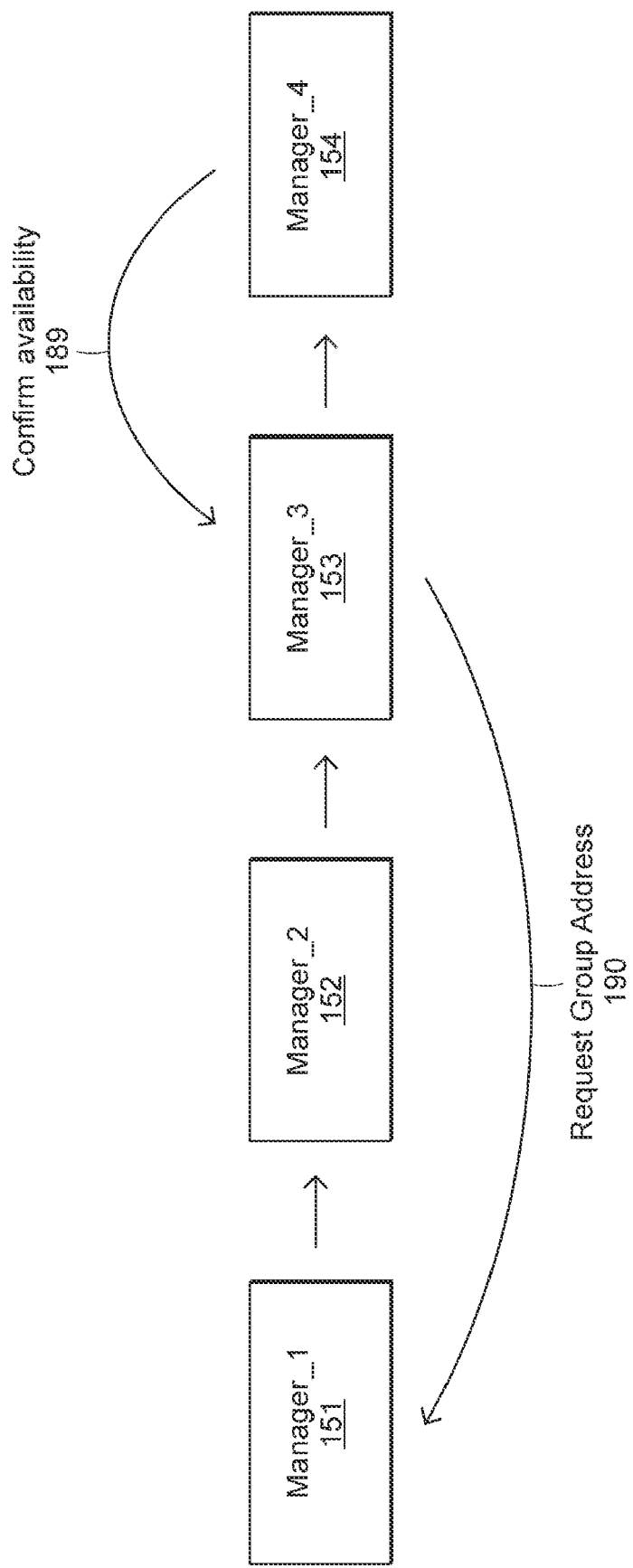
FIG. 23 shows how group addresses for groupcasts are obtained.

Another embodiment comprises a procedure for obtaining group addresses. The assignment of a group address to sources and sinks is done by the application's managers. Therefore a strategy is needed for a manager to find a free unused group address. Since a central instance for administration is missing, the managers have to negotiate group addresses by themselves. Therefore a manager requiring a free group address sends a group address request to the lowest manager in the priority chain. The request contains a group address which is estimated by the calling manager to be free. This request is passed upwards along the priority chain until it reaches a manager already using the group address. This manager informs the calling manager, that its request is rejected. If no manager rejects the group address request, the highest manager in the priority chain confirms the request. Now the group address can be assigned to the sources and sinks by the calling manager (FIG. 23).

F. Releasing a Right to Negotiate Source and Sink Access.

Another embodiment of an inventive network comprises means for releasing connections. If an existing connection is released, this can lead to a series of decisions having to be made. For example, if a user is listening to music when a phone call comes in, the music should again become audible once the phone call is finished.

Requests for disconnecting sources from sinks can entail the following:
  (i) When a last connection from a sink to a source is released, the source should stop streaming. Otherwise resources are occupied by sources, even if no user consumes their streams.
  (ii) When one of multiple connections between a source and a sink is released, other connections should stay.
  (iii) Once a connection has been released by a manager, other managers should be informed in order to be able to negotiate as to which manager should be the next to obtain access to these resources.

In a further embodiment, a manager sends a connection release request to the manager of highest priority in order to release a connection. From there it is passed from device manager to device manager down the priority chain. If one of these managers plans to take over a sink or a source from this connection, it marks this in the connection release request. Then a manager of lower priority will know that it will not obtain access to the resource. If a listed connection is still being used by another application, its manager marks this also. The manager with the lowest priority passes the connection release request back to the requestor. All resources which are not marked for further use are de-allocated by the manager.

In a further embodiment, means for stopping applications are provided. A scenario would be that of a user wanting to stop all audio sinks from playing music. Several audio selection managers could be distributed in different rooms for connecting sources to amplifiers. To make it possible for a user, a manager, or any other process or device to switch off applications, at least one manager is provided to have an exposed interface via which it can be told to return to the state which the application had after start-up of the system. With this, an application can be built which itself controls groups of applications. An argument can be passed through this interface to describe which type of applications shall return to startup status.

Examples of application types are: multimedia (amplifiers and loudspeakers, TVs, DVD, CD, STP, etc.); communication (phone, intercom, LAN, Internet, etc.); house technique (heaters, lights, etc.); and alarm systems.

Another embodiment provides means for garbage collection. It could happen that an application does not de-allocate unused resources. A reason for this could be a software bug, or that a device has been unplugged suddenly without having the chance of releasing used resources. In small systems, a user probably would not notice this, because once the resource has been used and then released by another application, the resource leak is eliminated. Thus no garbage collection has to be done in small systems.

In large systems having many resources, numerous resource leaks could lead to bandwidth limitations. Thus a garbage collector is provided to increase overall system stability. It comprises a garbage collection application. The manager of this garbage collection application preferably has the lowest possible priority. From time to time it sends a connection release request for all connected resources to the manager of highest priority. If there is still an application which uses the resource, its manager will mark the resource as being "still used" in the connection release request. If a resource is not used anymore, the garbage collection manager can safely release the resource.

In another embodiment, device manufacturers would assign default priority levels to managers of defined applications, in order to manage standard device interdependency. Preferably all manufacturers would assign the same priority to their managers of the same group of applications. Thus, all DVD players would have the same priority. Examples of priorities could be:

| | |
|---|---|
| Fire alarm system | 99 |
| Negotiation administrator | 90 |
| Profiler | 70 |
| Phone | 60 |
| Intercom | 50 |
| A/V selection | 20 |

Figure 9:
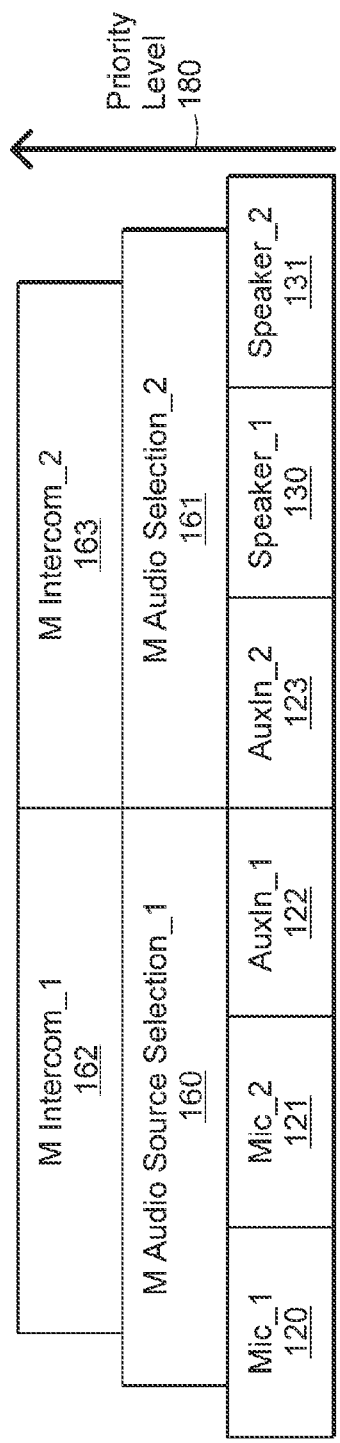
FIG. 9 shows a configuration with two possibly conflicting audio shuttles.

If such priority levels are assigned, small home networks usually would not require any manual configuration. Middle-sized systems could be configured by HMI, whilst large networks could be configured by specialists during installation and at run-time. If one or more managers have the same priority level, they are sorted by means of their node positions. If more than one manager having the same priority level is present at one device, they are sorted by means of their instance ID (FIG. 9).

A network according to the inventive concept can be very simple. It can consist of only a few devices like a TV, a DVD player, or a light switch and light actuator (relay, electronic switch). This permits setting up a network with very small initial cost. Later the network can be upgraded to a very complex network connecting all devices in a house. Furthermore, an inventive network can be used in offices, plants, hospitals, cars, aircraft, boats and any combinations thereof. It even permits a connecting of different networks together, like a network of a car with a network of a house.

In a further embodiment, at least one human machine interface (HMI) is provided. HMIs provide access to applications supplied within devices.

In another embodiment, the HMI comprises at least one display. This display can be treated as a sink. As distinct from a loudspeaker, it consumes graphical data. Like other sinks, a display does not need any special logic. It need offer only an interface or a function block allowing supplied data to pass.

In many multimedia applications known today, graphical data passes in very different formats, depending upon the application:

Video streams in MPEG1/2/4, Windows WMV, etc.
Images in BMP, GIF, JPEG, PNG, etc.
Script based data like HTML, Java, Macromedia Flash, etc.
Command based data (e.g. drawing of circles, filling circles with color, etc.).

Even a mixture of formats may be expected. A device model is invariant to new graphical formats.

Regarding these formats, it is obvious that different formats need different supply paths. For example, graphical data such as HTML which need be supplied only once, will be transmitted via the network's asynchronous channel. Contrary to this, a video stream needs to be supplied continuously. Thus, a synchronous or an isochronous channel is an optimal delivery path.

In a further embodiment, the HMI comprises at least one interaction control. Interaction controls allow a user to interact with devices in the network. They may comprise at least one of a button, a wheel, a rotary knob, a ribbon controller, a mouse, a keyboard, a touch panel, a remote control, and a voice input. Some of these interaction controls, like the increment/decrement buttons on a radiator thermostat, and the audio shuttle's buttons etc., could be linked with certain functions. Others, like the buttons of a graphical display, will have effects as indicated by the display.

Basically, the interaction controls can be divided into three groups:

(a) Hardware related. For example, an eject button of a DVD player. The actions of these interaction controls are unchangeable. Even if they can change the system so that the change is indicated by one or more displays, they are not addressable via the inventive network. Therefore they can be ignored in any further considerations.

(b) Function related. For example, small devices consisting of only an increment/decrement button may be distributed throughout the house, for example adjacent to a radiator for controlling temperature, or to light switches for controlling brightness etc. Every time one of the buttons is pressed, the same effect is caused. The devices have been configured once only and do not change over a long period of time. A speech command is another good example. It has been configured once only, and remains for a long period of time. It might be changed when the owner of the house changes, but then again it will stay unchanged for a long time.

(c) Context related. The effect of an interaction control changes quickly with time. It depends on a current context, as may be actually displayed. There may be cases in which a button does not cause any kind of action.

A model of these devices must be independent of the type and number of interaction controls.

HMIs may have various combinations of displays and interaction controls. Examples are: (i) an HMI which has only interaction controls; (ii) an HMI which is just a display; and (iii) an HMI which is composed of a display and a set of interaction controls.

An HMI will be used by different applications to become visible. During this use, the HMI represents the application. HMIs may represent applications as described below:

Device based applications: These are used in devices which do not share their displays and controls with other applications to be found in the network. An example could be a network radio device. On a simple display, an audio source can be selected. This could be, for example, a file from a media server's content. The HMI is completely bound to the device's application. No other application can connect to the HMI to interact with a user. The application using the display scans the network for available resources which can be used by it.

Another example is an application running on a PC, which does exactly the same as a device network radio. In this case, the application uses the PC's display and interaction controls without sharing these resources with other applications found in the network.

Since device based HMIs are not visible to the network, they are not relevant to the system's plug & play behavior. Thus they can be neglected in further considerations. Such device based HMIs contain no function block for their HMI.

Command based applications: Within the command based strategy, an application needing to be represented uses commands which are mainly sent from the application to the HMI, but also the other way round. Commands are used to: (i) query a display's capabilities (its graphical operations, resolution, color depth, number of function keys, etc.); (ii) request a display to perform graphical operations (render text, draw a circle, draw a line, etc.); and (iii) obtain interaction (user-pushed function button, user-clicked at a position, etc.). GDI, XWindows, or MOST's automotive function block "graphical display" are typical command-based representations.

Descriptor based applications: Within this strategy, an application supplies an HMI with a descriptor containing information on an application menu and the state variables which can be changed within certain limits. The descriptor does not provide concrete information about how a graphical representation on the display has to look like. It only indicates the necessary components which the user will need to control the application in an effective way.

A descriptor for an application, which for example allows selection of an audio source and control of the volume, could look like this:

```
{
    var enum source
        range { none, CD, tuner, iPod }
        value { tuner }
```

-continued

```
    var uint volume
        range { 0,255 }
        steps { 1 }
        value { 80 }
}
```

Figure 29:
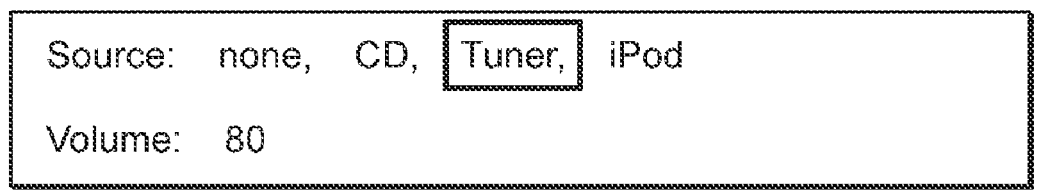
FIG. 29 shows alphanumerical representation of data in a display.
Figure 30:
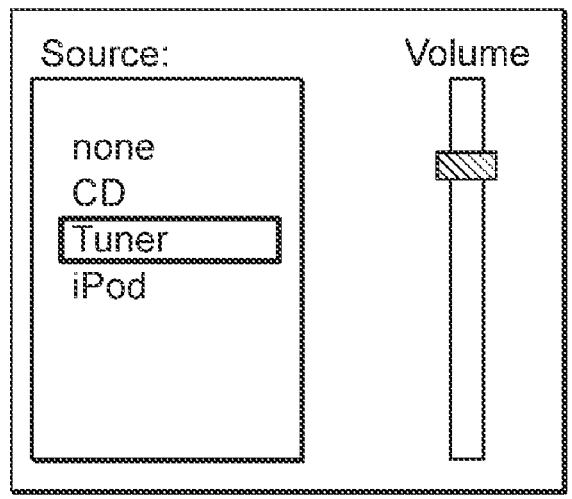
FIG. 30 shows graphical representation of data in a display.
Figure 31:
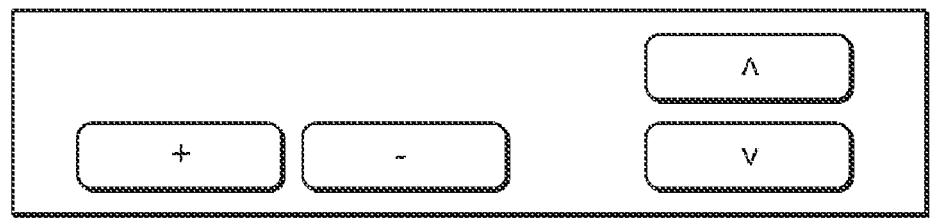
FIG. 31 shows a simple HMI without display.

The visible representation of the descriptor is completely performed by the HMI. (Typical displays are shown in FIGS. 29, 30, and 31. Even the HMI shown in FIG. 31 sufficiently illustrates an example.)

Browser based applications: The browser based strategy is a kind of a mixture of the command based and the descriptor based strategy. Instead of supplying a descriptor, the represented application supplies HTML, JAVA, etc. code. This code contains commands concerning how the graphical representation has to look like. The HMI is a browser which interprets the code and tries to render it optimally. The interaction is also regulated by the code. For example, if the HTML contains a button to be pressed on the HMI, this causes a HTTP request from the HMI to the represented application. Examples of standards using this strategy are UPnP and MHP. Instead of HTML, JAVA, and HTTP, other mechanisms could be used.

The following table compares the previously explained strategies.

|  | Command | Descriptor | Browser |
|---|---|---|---|
| OUTLAY OF SOFTWARE NEEDED FOR REPRESENTED APPLICATION | Low for alphanumeric displays, which e.g. accept only a defined set of events (e.g. DVD remote control). Very high for graphical representations | Minimal | Medium. Even complex representations can be held static in the device's ROM. For Interaction HTTP, requests need to be handled. |
| OUTLAY OF SOFTWARE NEEDED FOR HMI | Low for alphanumeric. Very high for graphical HMIs, since a complete graphic stack is needed. | Medium. Software depends on the display hardware | High for embedded devices, since a browser is needed. Minimal for devices using an operating system like Windows, Linux, etc. |
| POSSIBLE QUALITY OF REPRESENTATION | Maximum | Depends on the HMI-application | Can become very low if the HTML is not optimized for the HMI's display resolution, but also can be very high, if it fits. |
| ALPHANUMERIC HMI POSSIBLE | Yes | Yes | No |
| HMI WITHOUT DISPLAY POSSIBLE | Yes | Yes | No |
| SYSTEM-WIDE LOOK & FEEL | Not available. Each device supplies own graphic commands | Available, since representation of all applications is performed by the HMI application | Not available. Each device supplies own graphic commands |
| CONTENT DIRECTORIES | Easy to implement | Easy to implement | Medium effort |
| UPnP COMPATIBILITY | None | Some of the Descriptors could be used as UPnP XML Descriptors. There could also be a translator which translates a Descriptor into the representing HTML-Page | 100% |

Figure 32:
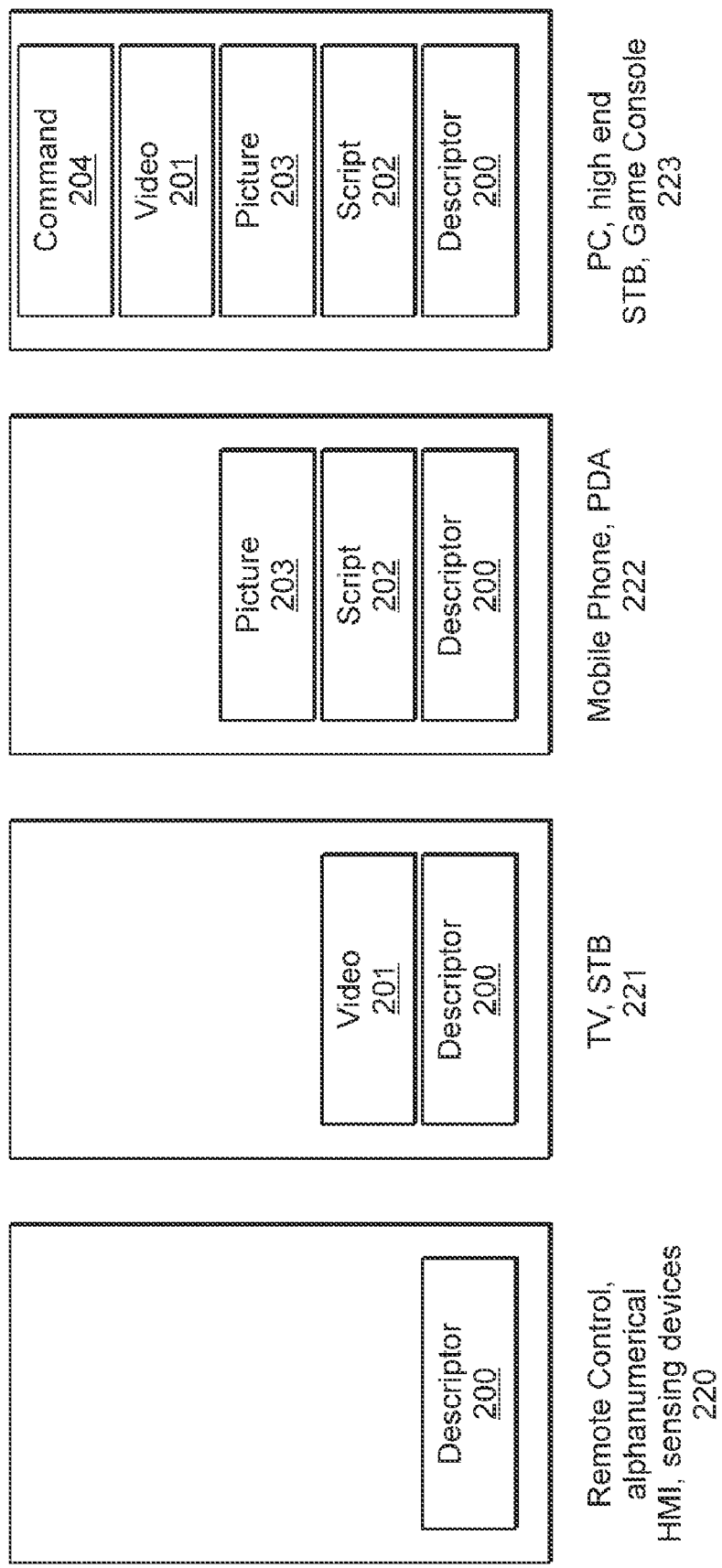
FIG. 32 shows examples of differently equipped HMIs.

In another embodiment, each network-enabled HMI provides at least a function block for descriptor-based representation. As shown above, there may be many different HMI devices offering different facilities. Whilst maintaining the requirement that in addition to graphical HMIs, also HMIs without display and alphanumeric HMIs shall be supported, and taking into account that command based representation could be too complex for simple devices, the descriptor-based representation should be supported by each HMI. This will lead to a minimum of concordance between all HMIs, and applications can become represented at each HMI. On the other hand, each manager will need the corresponding functions within its function block in order to receive the HMI's interaction events (FIG. 32).

Cases of use in which HMIs are involved and divided by actuators are:

User at the HMI
  Selection of an application.
  Walking through the applications menu.
  Changing application's parameters/properties.
  Calling application's methods.

Application
  Popup at one or more displays caused by events (e.g. a phone/intercom call arrives)
  Render one or more displays.

Figure 34:
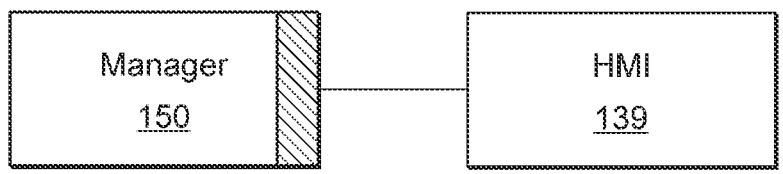
FIG. 34 shows a manager accessing an HMI.

Most of the items listed above concern access to an HMI. As already mentioned, an HMI could have several sinks to which sources can be connected. A DVD player could be such a source. Beside this, each application within the network is a possible source, if it wants to offer the user the possibility of interaction to control the application. Thus, applications also need to be sources (FIG. 34).

There could be competition between several applications for displaying something. In case of a simple display which does not support windows, if one application connects to the display, another application has to be disconnected. For organizing this competition, the same mechanisms as for any other sink are used (FIG. 35).

Figure 36:
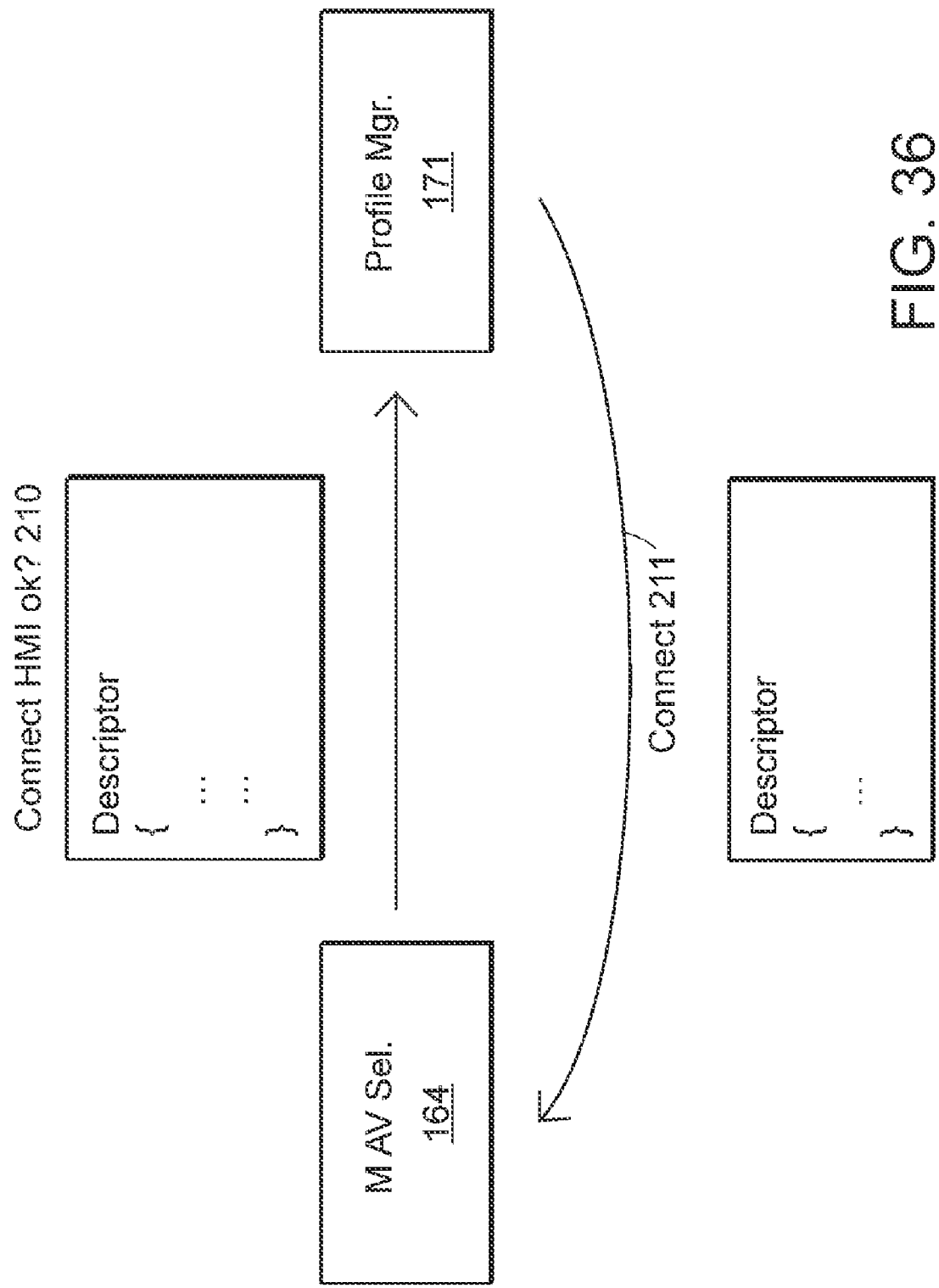
FIG. 36 shows change of a descriptor during requesting a connection to an HMI.

In another embodiment, to enable the system to support complex profiling and rights administration, a manager receiving from another manager a request for connection to an HMI can change either the connection request or the descriptor. These changes have to remain within certain limits. As an example, the request can be reduced, ranges of values can be diminished, or variables can be removed (FIG. 36).

Figure 37:
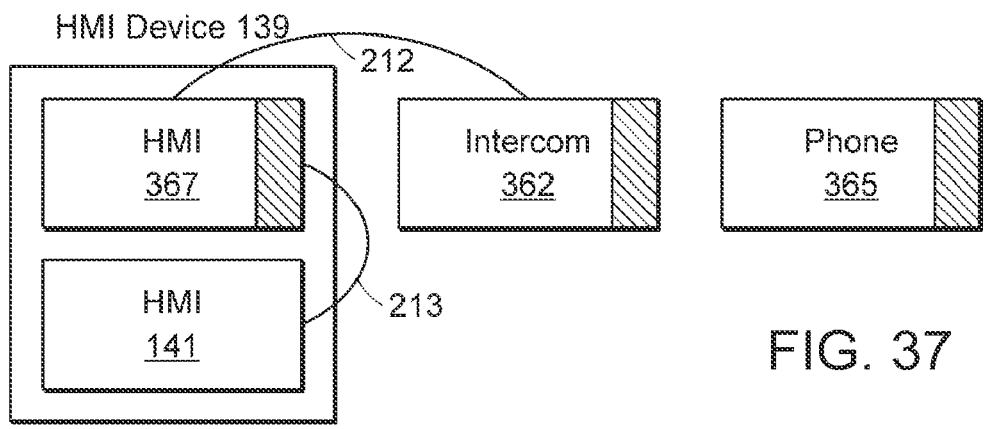
FIG. 37 shows an HMI's manager selecting an Intercom's manager for interaction.
Figure 38:
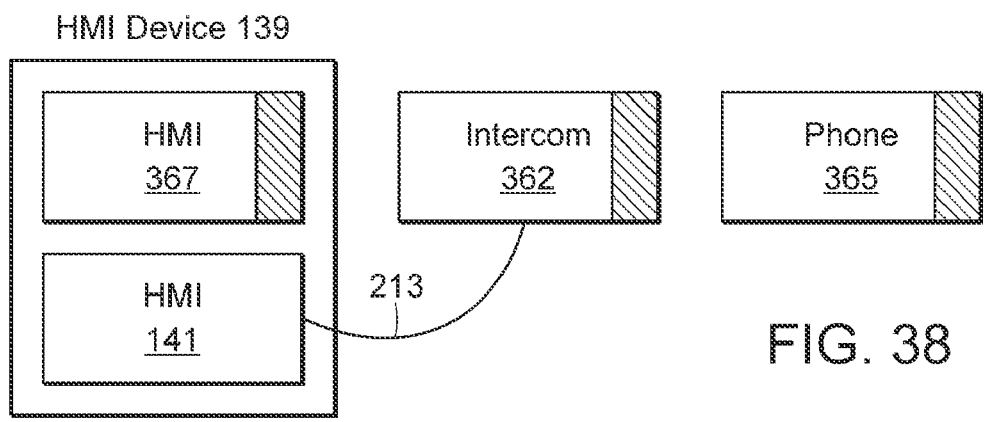
FIG. 38 shows an Intercom's manager connected to HMI.

In another embodiment, an HMI provides its own application. Usually an HMI device having a display will offer the user a menu listing all available applications. The user then can select one of them for interaction. In presently used terms, an HMI is composed of one or more sinks for graphical data and interaction. By definition it needs no own application's manager. Thus, circumstances are conceivable in which no application's manager wishes to connect to the HMI. To allow for this situation, the HMI device should bring along its own manager. If no other manager is connected to the HMI, it connects and offers a user a menu of all available application's managers. If the user selects one, the HMI's manager advises the selected manager to connect to the HMI (FIGS. 37, 38).

Figure 39:
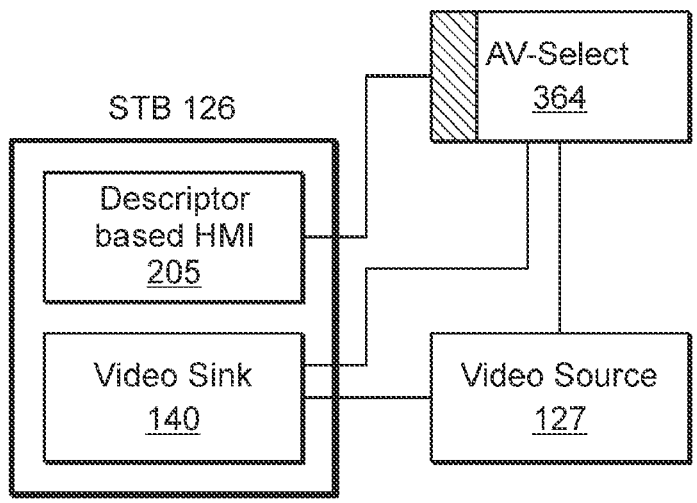
FIG. 39 shows an HMI with multiple sinks.

In a further embodiment, at least one HMI capable of rendering video, graphics etc. provides function blocks in addition to the function block which accepts a representation descriptor. If an application wishes to render video, it will scan the network for HMIs with the corresponding decoder function block, and when finding one it will connect a source to that sink. The same procedure is performed for other formats. This strategy keeps a network according to the invention open for future formats (FIG. 39).

In case an HMI has interaction controllers, events occurring via a user's input have to be announced to the application which is currently connected to the HMI. How this communication between an HMI's sink and the connected application is effected in detail will very much depend on the format, or in other words, on the type of function block that the sink is. A typical video sink will probably have no interaction at all. A command based sink might send events like "mouse move," "mouse click," etc. These details will all be clarified in the target specifications of those function blocks. The descriptor based representation should be supported by all HMIs and all applications.

In the example script below, an application offers two variables which are the "source" and the "volume." The HMIs can read from the script the limits within which these variables can be changed.

```
{
    var enum source
        range { none, CD, tuner, iPod }
        value   { tuner }
    var uint volume
        range   { 0,255 }
        steps   { 1 }
        value   { 80 }
}
```

A response to a user interaction is completely effected by the HMI device. There could be buttons, wheels, speech detection, etc. Once a user has changed a variable, the HMI informs the connected application of the variable and its new value.

A further improvement is to have an MAC Address within each network interface controller chip.

In this document the terms "network" and "bus" are used as being equivalent.

The term "device" refers to any kind of electronic device connected to the network, such as a TV, a DVD player, a light switch, or a light actuator. In an object-oriented model the term device is also used to denote a function block of a device, or its source or sink. This is because several function blocks can be contained in a single device.

The term "application" means software implemented on a device. An application may communicate with and/or control any other device or application.

The term "MOST" refers to the MOST® Standard as defined by the MOST Corporation in the "MOST Specification," Revision 2.4 dated May 2005 which is incorporated herein by reference.

A "function block" is a functional entity on an application level within a device. A radio device may contain tuner, amplifier and CD player function blocks. There may be further function blocks for special purposes like network connectivity or diagnosis. Each function block contains a number of single functions. For example, a CD player has functions like play, stop, eject and time played. To make a function accessible from outside, the function block provides a function interface which represents the interface between a function in a function block and its use in another function block.

The term "source" relates to a source of data, preferably synchronous data, and is normally represented by a function block.

The term "sink" relates to a sink for data, preferably synchronous data, and is normally represented by a function block.

The term "resource" represents an abstract description of a network. It comprises sources, sinks, and network bandwidth.

Figure 1:
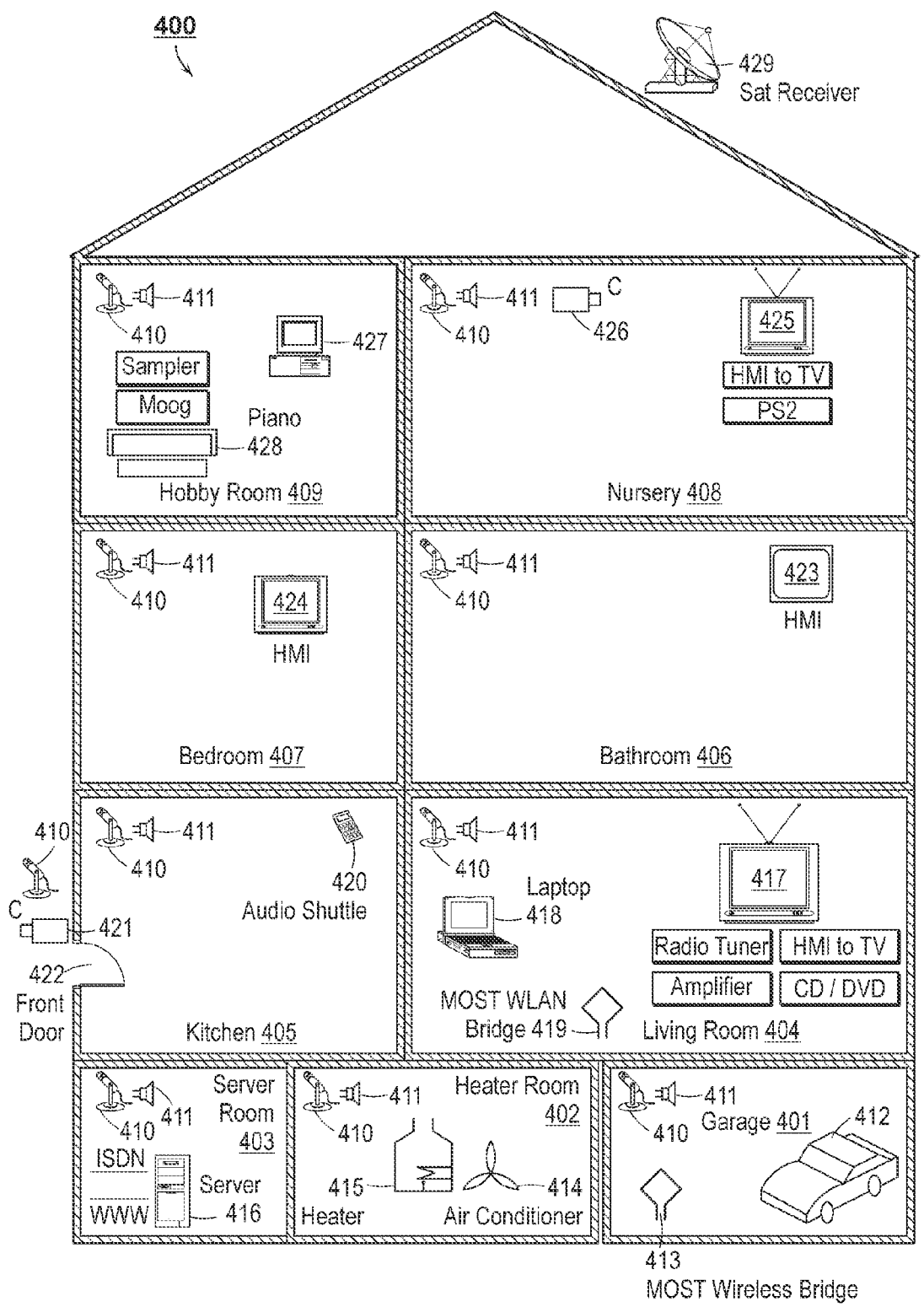
FIG. 1 illustrates a typical application of a network according to the invention.

FIG. 1 illustrates a typical application of a network according to the invention. A house 400 comprises several rooms, each being equipped with at least a loudspeaker 411 and a microphone 410.

In a garage 401 further means like a wireless bridge for MOST 413 for communication with a car 412 are provided. Therefore the house's network is preferably compatible with the car's network system like MOST.

In a heater room 402, a heater 415 and an air conditioning 414 system's device controllers are connected to the network. On displays distributed over the house, information can be retrieved, such as current temperatures, energy consumption, how long an oil tank will last, etc. The devices can also be remote controlled. They can be switched on and off, and temperatures can be set, and so on.

A PC is located In a server room 403 to act as a house server 416. It has connections to the Internet (WWW) and to a telephone network (ISDN). In combination with room's microphones and speakers, phone calls can be made anywhere in the house. A general phone book is also managed by the server. Naturally, other PCs and laptops in the house can surf in the Internet via the server. The server holds an audio file collection and acts as an audio player in the network. It also supplies a selection of audio files to the car's audio system.

The server is assumed to be switched off at night by a hardware timer. Since the network according to the invention does not need a central PC, the remaining devices continue to work normally.

A network intercom is installed at a front door 422. It is composed of a camera 421, a microphone, a speaker, and a bell button.

Persons working in a kitchen 405 can listen to an audio stream using a MOST Audio Shuttle 420. Of course, phone calls can be made, and persons in other rooms talked to, etc.

In a living room 404 is a common TV 417 connected via a network HMI to a TV box which is supplied with a remote control. Network HMI to TV turns ordinary TV into a full network HMI. All available video streams can be viewed, whilst the whole network system is controlled via convenient menus. If a source containing audio is selected, an amplifier is used instead of TV's loudspeakers.

A graphical network HMI can render visible any graphical content via a TV screen. Video can be displayed full screen or in a window. A laptop 418 is connected via a network WLAN Bridge 419 to the network. It could also act as network HMI. It is of course connected to the Internet via the server.

A bedroom 407 is equipped with a TV 424 which can be directly plugged into the network ring and can decode all available video streams. It acts also as network HMI and offers a menu which, for example, allows an alarm to be set to awake a user in the morning.

A bathroom 406 has, in addition to common intercom devices such as a microphone and a loudspeaker, a waterproof flat panel display 423 which is embedded in a wall. Like the bedroom's TV, this is a network HMI giving an optimum connection to the overall functionality, but it is built by a different manufacturer. Instead of by remote control, this display is controlled by a touch panel.

A nursery 408 has an old TV 425 and a network HMI to TV which has access to some TV stations during particular hours. Other stations cannot be seen. A game console (PS2) is connected to the network HMI to TV. A camera 426 is also provided.

In a hobby room 409 there are a keyboard (piano) 428, a sampler, and some synthesizers (moog). All these devices are connected via a network Audio/MIDI Bridge. The PC 427 in the room acts as multi track recorder, audio mixer, and sequencer. It is connected via a network PCI board. Legacy music equipment is connected via an audio mixer which offers a network interface. Musicians may bring their own instruments and connect them to the network. Thus the number of devices changes dynamically. Full plug and play functionality is required.

Figure 2:
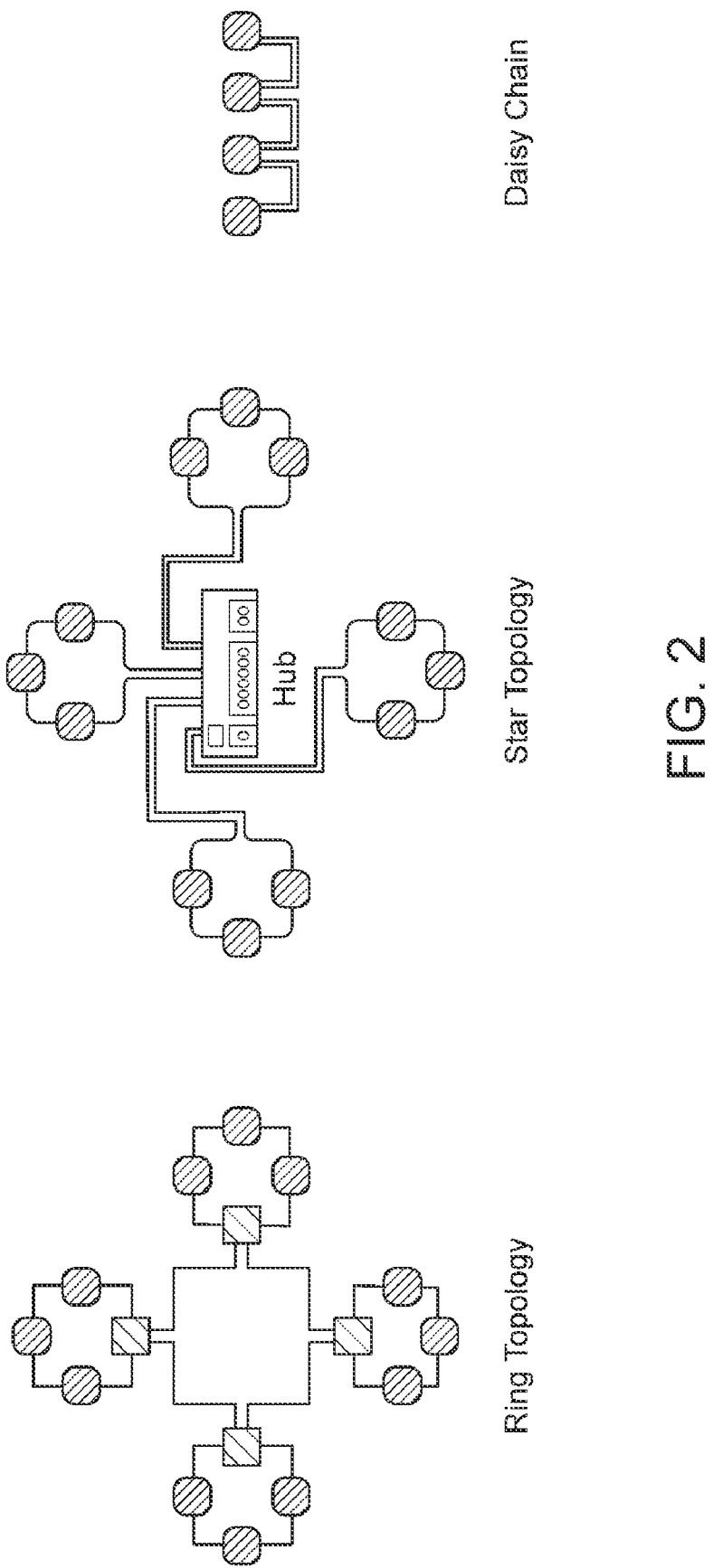
FIG. 2 illustrates some typical network topologies.

FIG. 2 illustrates some typical network topologies which could be used together with the invention, although the invention is not limited to these topologies. To obtain a smooth working system, preferably a sub ring or subnet is provided in each room. Then a distortion caused by plugging/unplugging can be heard only in the room in which this is done. Other rooms are not affected.

In a ring topology (left), several sub rings SR consisting of nodes (hatched) are connected via a repeater to a central ring. In a star topology (center), the sub rings are connected to a central hub. The ring topology and the star topology are nearly the same. In the star topology, the ring topology's repeaters are all connected together in a single device, the hub. In a daisy chain (right), each node N has two in/out pairs. The first and last nodes of a chain each terminate close the ring. All topologies can be combined according to local needs. To enhance network performance and size, sub rings or subnets may be interconnected by switches.

FIG. 3 shows in an object-orientated model a manager (management logic) 150 scanning the network. It contacts each source 101, 102, 103 of N sources and each sink 110, 111, 112 of M sinks and retrieves a plurality of information. On the basis of this information, a manager decides which sources and sinks will be relevant for further work. An application could perform scanning, for example once at startup time, each time the number of nodes in the network changes, or at regular or random intervals. In any case, a manager is at any time allowed to query information from a source or a sink.

Figure 4:
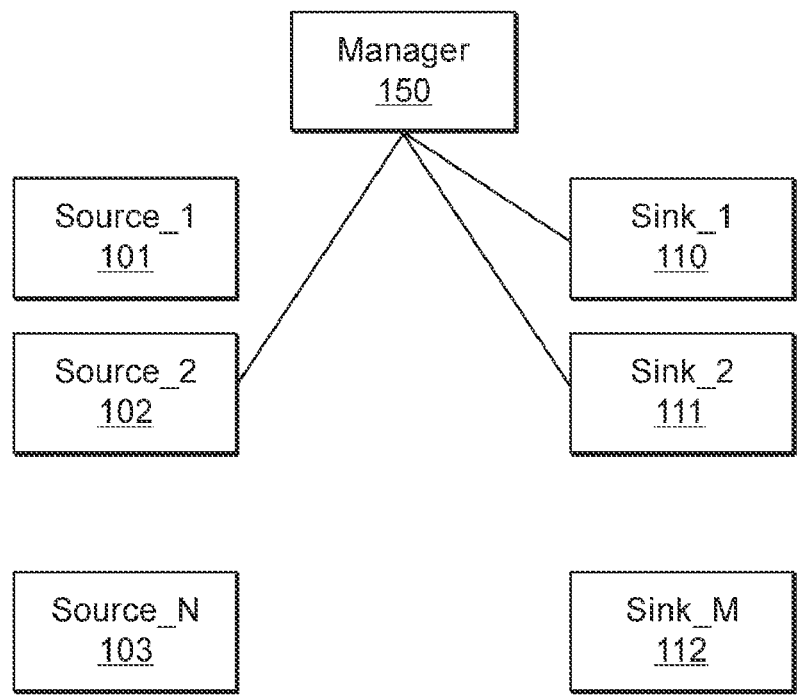
FIG. 4 shows a manager sending control messages to some of the network's sources and sinks.

FIG. 4 shows a manager 150 sending control messages to the network's source_2 102, sink_1 110 and sink_2 111, which leads to a state change of these sources and sinks.

Figure 5:
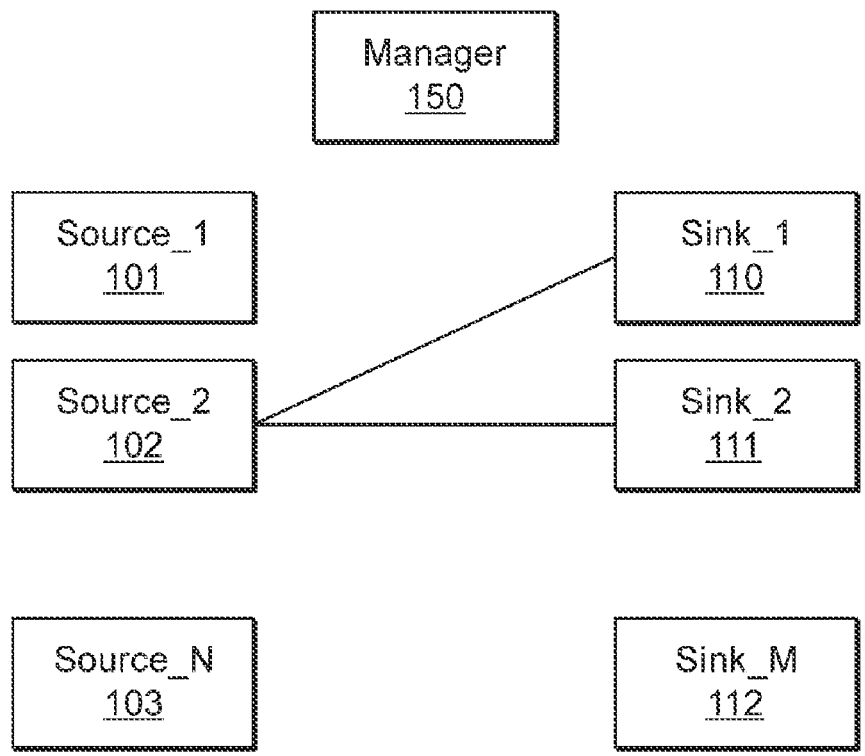
FIG. 5 shows connected sources and sinks.

FIG. 5 shows source_2 102 connected to sink_1 110 and sink_2 111. When at least one sink is connected to at least one source, data can be transmitted. This could not only be synchronous data, like audio or video streams, but any other type of data. A good example for asynchronous data transmission could be an Ethernet connection between two PCs. Specifically MOST connections are quite different from other connections, e.g. a TCP connection. For example, on MOST a transmission is connectionless, which means that on the network layer the source does not recognize whether the sink disappears, and vice versa. Thus each manager is responsible for its own connections. A manager must not start a source streaming without having a sink to consume the stream. Also, a manager must not stop a source from streaming, if there is still a sink connected. If there is neither a source nor a sink, no data is transmitted via the network.

Figure 6:
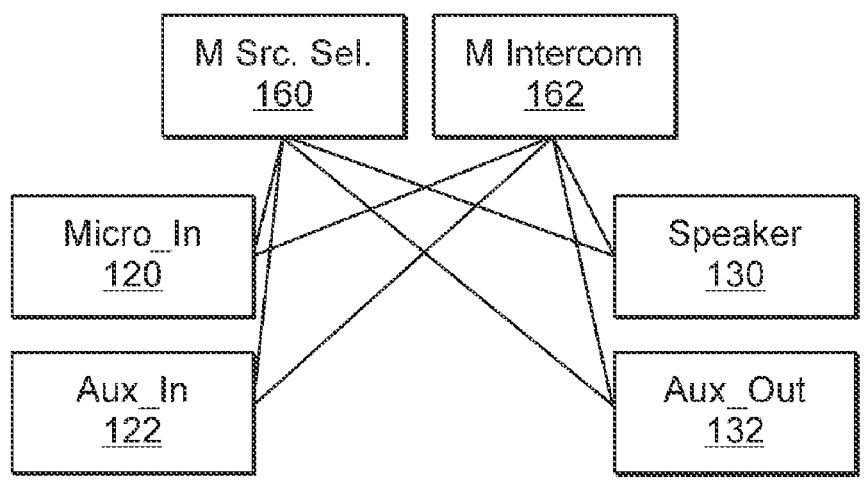
FIG. 6 shows an example of an audio shuttle.

FIG. 6 shows an example of an audio shuttle. Via the audio shuttle's buttons, a user controls two applications: 1. Selecting a source for listening to music. 2. Using the intercom. For each of both applications, a manager is provided. The audio source selection manager 160 and intercom manager 162 control available sources micro_in (microphone) 120 and aux_in (auxiliary input) 122, and the sinks loudspeaker 130 and aux_out 132. According to the user's selection, sources and sinks will be connected. In the Figures, managers have a prefix 'M' in front of their names.

FIG. 7 schematically shows a more complex network comprising different devices 100 having sources and sinks like loudspeaker 130, microphone 120, auxIn 122 (auxiliary source input), camera 124, HMI 139 (Human Machine Interface), tuner 125. Between these, a group of managers 150 controls these sources and sinks. These managers comprise managers for audio source selection 160, intercom 162, phone 165, home automation 166, and AV source selection 164. Furthermore, a profiler 171 and a negotiation administrator 170 are provided.

FIG. 8 shows a model similar to the previous one with assigned priorities. A first step for regulation of the switching of streams is the introduction of priorities. If a stream is consumed at a sink and another stream arrives with a higher priority, the stream is switched or mixed in. If the priority is lower, the arriving stream is ignored. For example, a person not wishing to be disturbed in the bath could select the highest priority for the music application.

Priorities could also be used to handle conflicts resulting from a lack of resources, if for example there is insufficient bandwidth for transmission of a phone call, etc.

If every manager in a house were to connect sources to sinks without informing other managers, chaos might result. On the one hand, a high level of automation is required. Thus music may automatically start to play when a new CD is inserted into a CD player. On the other hand, this automation could lead to conflicts. Thus a phone call could be lost, when the CD is changed. To prevent this, a structured access to the sources and sinks is required. This is done by assigning priorities. The managers for intercom 162 and phone 165 have the highest priority of all managers. Below them is the audio source selection manager 160. Below this is the HMI manager 167. All devices themselves, like speaker 130, microphone 120, auxIn 122, camera 124, HMI 139 and graphical display 139 are on a common priority level below that of the managers. Above the managers is a negotiation administrator 170, and below this is a profiler 171.

FIG. 9 shows a configuration with two possibly conflicting audio shuttles. There are a manager intercom_1 162 and a manager intercom_2 163 on a same level above managers audio_source_selection_1 160 and audio_source_selection_2 161. The only indefiniteness in this model arises from the fact that an existence of managers with the same priority level is allowed. This can be remedied by an additional rule: If two or more managers have the same priority level, they are distinguished according to their node position. If at one node, more than one manager exists with the same priority level, they are distinguished according to their instance ID.

Figure 10:
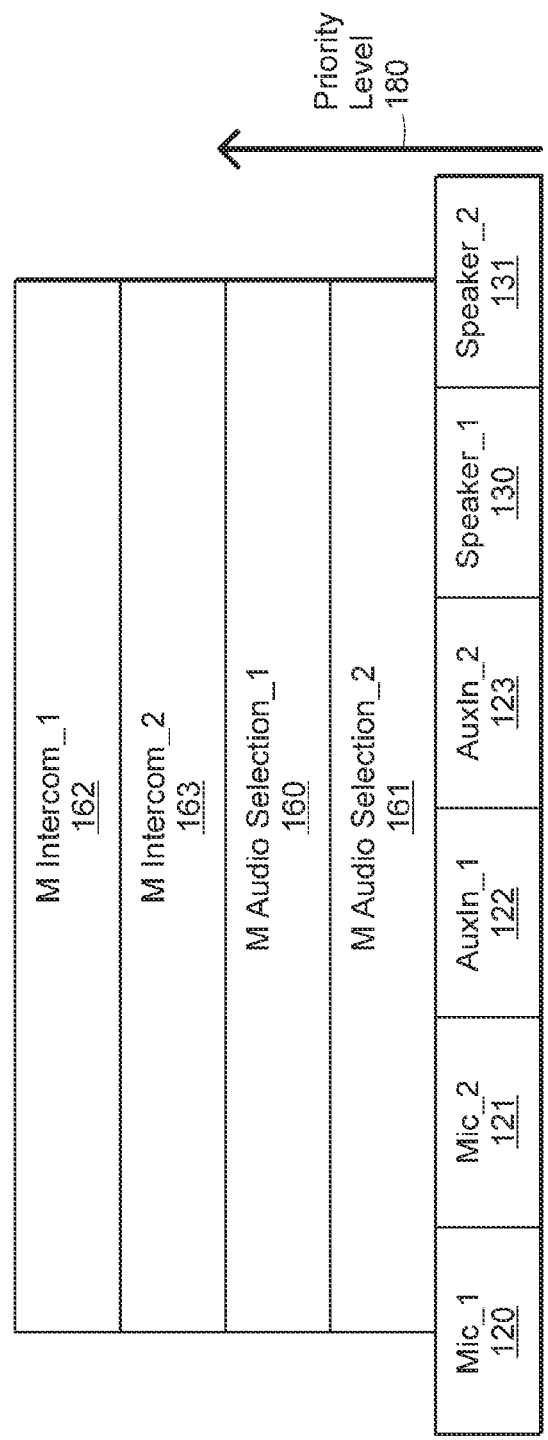
FIG. 10 shows a configuration with two audio shuttles and unique priorities.

FIG. 10 shows a configuration with two audio shuttles and unique priorities derived from the previous configuration. Adjustment is done by setting the priority level 180 of the manager intercom_1 162 above that of the manager intercom_2 163, and that of audio_selection_1 160 (audio selection is equivalent to audio source selection) above that of audio_selection_2 161, thus maintaining a basic order of intercoms being above audio selections. Now the previous pyramid structure has been converted to a linear chain of priorities.

FIG. 11 shows a process of obtaining a right to negotiate source and sink access. The managers shown are arranged from left to right in order of increasing priority. In a first step, manager_2 151 requests 181 a right to negotiate from the negotiation administrator which is comprised by manager_4 154, the manager with the highest priority. This is then confirmed 182 by the negotiation administrator, manager_4 154.

FIG. 12 shows the connection request procedure of the previous example with two audio shuttles in a house. If the application's manager audio_selection_1 160 wants to establish a connection between aux_in_2 123 and speaker_1 130, a request 181 is made to the manager intercom_2 163, from there a request 181 is made to the manager intercom_1 162, and from there a confirmation is sent back to the manager audio_selection_1 160. If there is an open intercom connection, managers intercom_1 or intercom_2 could refuse the incoming connection request. Thus an intercom connection always stays undisturbed by the audio source selection manager. In the example above, no intercom connection is open and the request is positively passed back to the calling manager. Now the manager can cause the aux_in_2 source 123 to allocate bandwidth and to start streaming. Once that is done, the speaker is called to consume the stream.

FIG. 13 shows a request which is modified by a profiler. Owing to a passing of connection requests from manager to manager, a higher leveled manager has a possibility of modifying a request. Here the manager audio source selection 160 sends a connection request 181 to the profiler 171. Here the connections of CD to speaker left 183, CD to speaker right 184, and CD to subwoofer 185 are requested. If the profiler wants to prohibit the use of the subwoofer during the evening hours, it simply removes the subwoofer from incoming connection requests. The part in which the connection of the other speakers is handled stays untouched. The profiler therefore returns a confirmation message 182 granting the connections of CD to speaker left 186, and of CD to speaker right 187. This feature could also be used to route a source via additional applications before passing it to the sink. For example, an audio equalizer could be chained-in.

Figure 14:
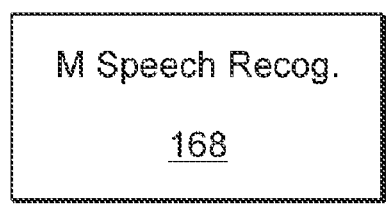
FIG. 14 shows a model of a system with speech recognition software and a microphone.
Figure 14:
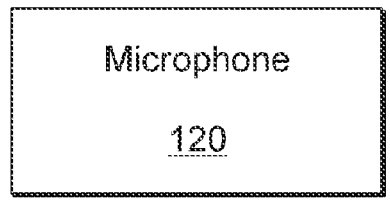
Figure 15:
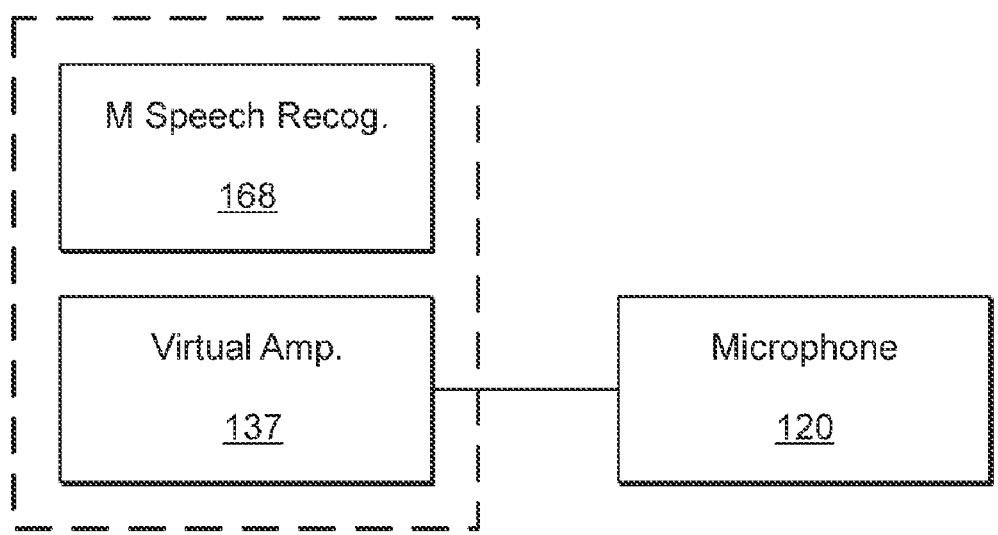
FIG. 15 shows the model of FIG. 14 together with a virtual sink.

FIG. 14 shows the model of a system with a PC connected to run a software package for speech recognition. The speech recognition uses a microphone in a room. Since there is no sink in the system, the speech recognition manager 168 cannot connect the microphone 120 to anything. This problem is solved by the speech recognition software 179 by exporting the function block amplifier to the system, a typical function block of a sink. This virtual amplifier 137 now can be connected to the microphone as shown in FIG. 15. If another application's manager than the speech recognition manager tries to connect the device to anything, it can refuse this request. So this virtual device cannot interfere with other applications. In the same way virtual sources may be generated.

Figure 16:
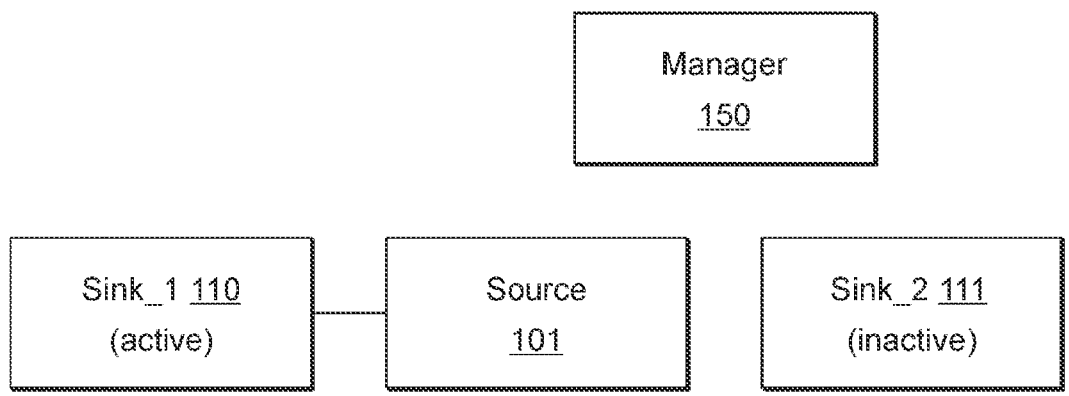
FIG. 16 shows a scenario with a source which can be connected to only a single sink.
Figure 17:
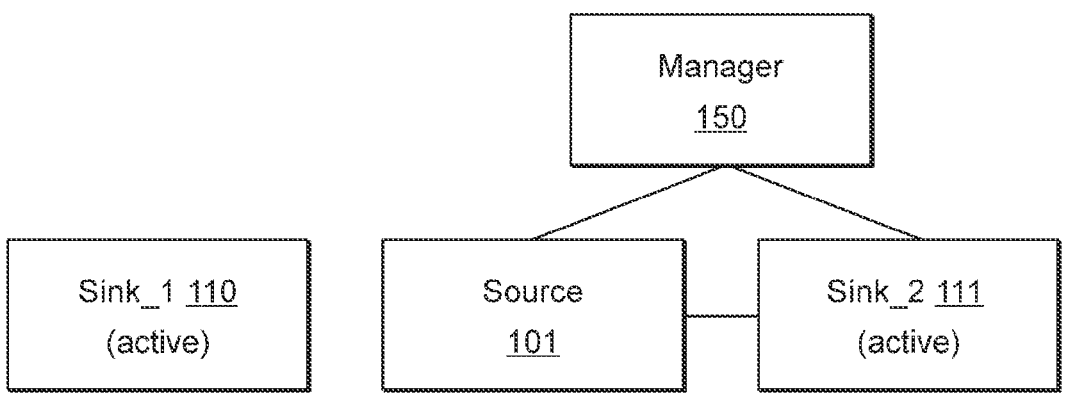
FIG. 17 shows a scenario of FIG. 16 with a new link.

FIG. 16 shows a scenario with a source 101 which can be connected to only a single sink. This source 101 has been connected to the active sink_1 110 in the past by an unknown manager. If now another manager 150 connects this source to another sink (here sink_2 111) as shown in FIG. 17, the primary sink_1 110 which is still in an active state does not receive any more (valid) data from the source 101. The manager 150 does not know about sink_1, since it is not part of it's application. Thus sink_1 is not instructed to stop consuming the data from the source before the connection to sink_2 is established. If sink_1 is an amplifier, random noise could become audible. Such effects can occur only if a source or a sink is already in use and this source or sink does not support multiple connections. In this case a manager has to inform all other managers before it establishes a connection. Then the manager which owns this critical connection has a chance to disconnect it. Later, when the manager is informed that the resource has been released, it might try to connect again by sending a connection request.

Figure 18:
FIG. 18 shows a point to point connection.
Figure 19:
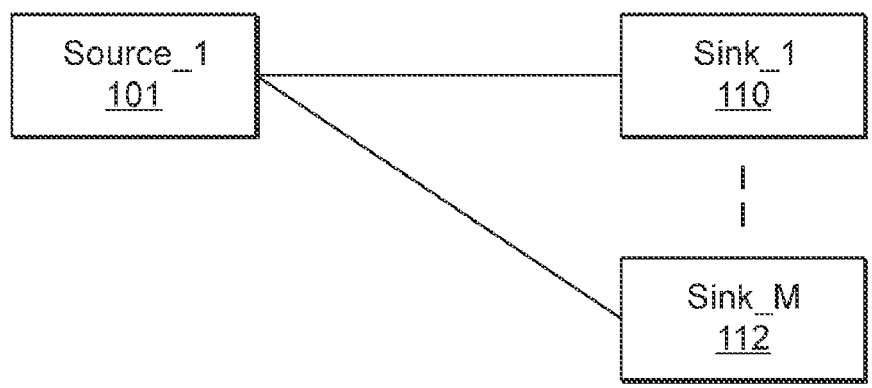
FIG. 19 shows a point to multi-point connection.
Figure 20:
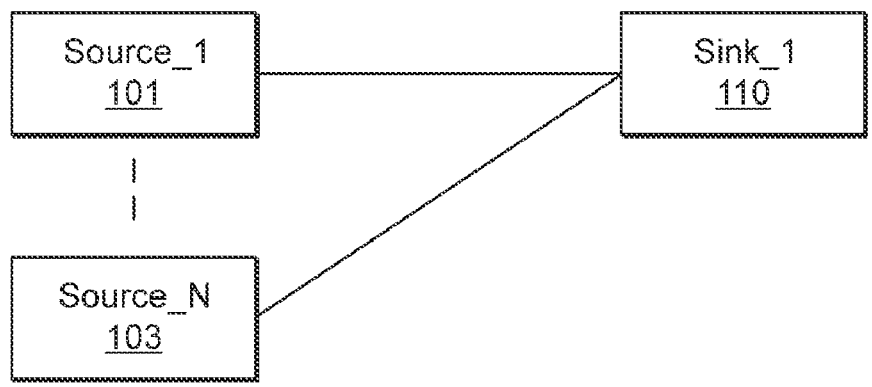
FIG. 20 shows a multi-point to point connection.
Figure 21:
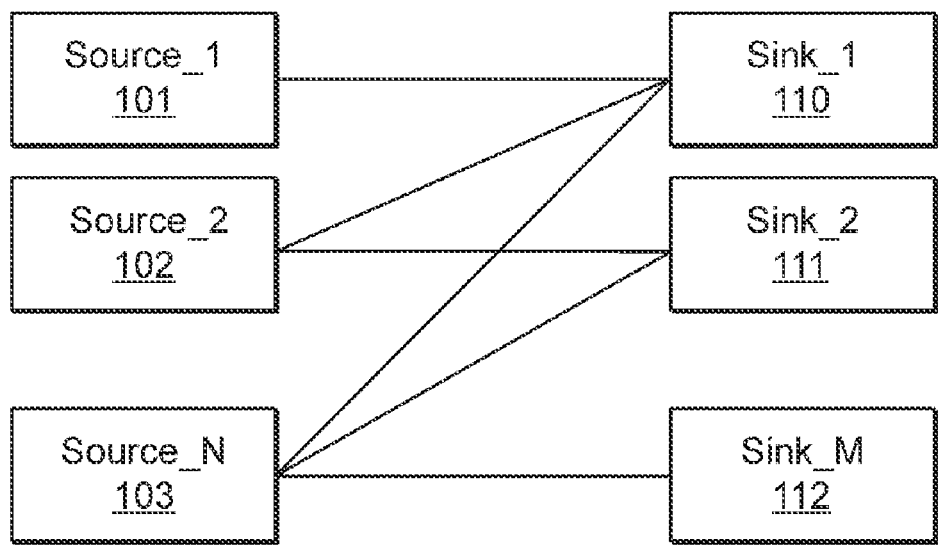

FIGS. 18-21 show different types of connections between source(s) and sink(s) which can be used for synchronous transmission. FIG. 18 shows a connection with source_1 101, which allocated a synchronous channel and a stream on that channel connected to sink_1 111 which consumes the stream. More than one synchronous connection can have the same source, as shown in FIG. 19. In this case all sinks from sink_1 110 to the m-th sink_M 112 consume the same stream which is provided from the source. This could be the case if multiple TVs in a house show the same video channel. Finally one sink, here shown as sink_1 110, might consume several data streams from source_1 101 to the n-th source_N 103, like an amplifier which mixes two incoming audio streams to one audible stream. Similar types of connections can be used for asynchronous transmission. In addition, n-to-m connections can be used as shown in FIG. 21. Here some of the n sources are connected to some of the m sinks. There may be exceptions, like applications using peer-to-peer protocols which require a one to one relation between a source and a sink.

Figure 22:
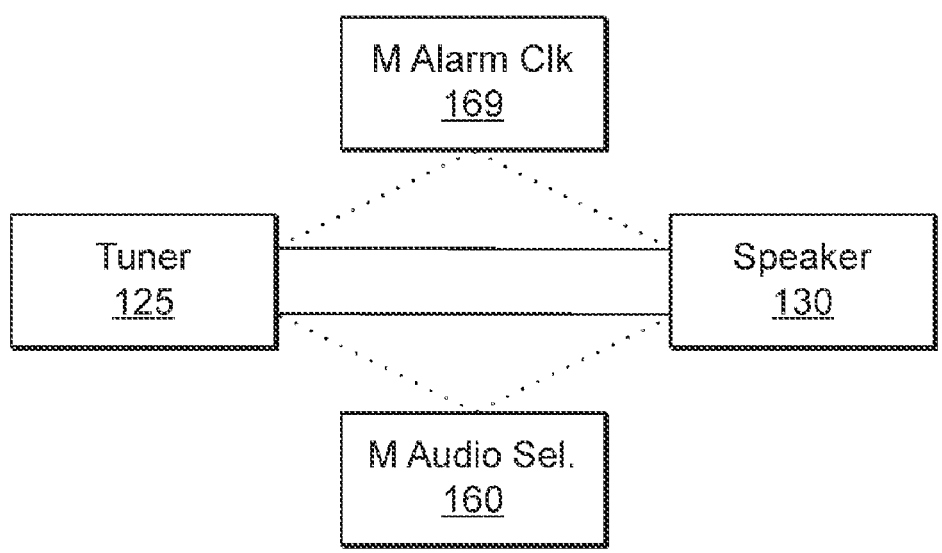
FIG. 22 shows a parallel connection between a tuner and a speaker.

In FIG. 22 a parallel connection between a tuner 125 and a speaker 130 is shown. In an exemplary sleeping room there are an application alarm clock and an application audio selector. In the morning the alarm clock manager 169 connects the tuner source 125 with the loudspeaker 130 at the set alarm time. A typical case may be that a user awakes before the alarm starts and selects the radio using the audio selector. A few minutes later the alarm tries to start. It will send a connection request to managers of higher priority. If none object, the connection is granted. The tuner is requested to allocate a synchronous channel and to start streaming. The loudspeaker is requested to consume the stream. From a logical point of view, there are now two parallel connections (straight lines) between the tuner and the loudspeaker. The dotted lines symbolize the communication between managers and source and sink for setting up or releasing connections. In any case, when the alarm clock requests the tuner to start streaming, it should reply that it is doing so already. The same should apply to the loudspeaker. In the case of the alarm clock, the manager could decide that its job to awake the user is therewith done. In other cases it might be useful for a manager to address this logical connection as if the connection has just been switched. Since this finally depends on the application itself, parallel connections should be supported. If parallel connections are combined with 1-to-n and n-to-1 connections, very complex connection scenarios can occur.

FIG. 23 shows how group addresses for groupcasts are obtained. Manager_3 requests 190 a free group address starting with the lowest priority manager which is manager_1 in the priority chain. Since none of the managers reject the request, it is confirmed 189 by manager_4 which is the highest manager in the priority chain to manager_3. To prevent false addressing, a device should not be assigned any group address after startup. If a manager closes a connection, the involved devices should be removed from the corresponding group. The above algorithm also works if devices can be members of more than one group. In FIGS. 23 to 27 the priority of the managers increases from left to right.

FIG. 24 shows how resources can be set free. In this example, manager_3 requests 191 manager_1 to set free resources. Since manager_1 allocates these resources, it frees them and confirms 189 the availability back to manager_3 which now can establish the planned connection. If a manager which has been requested to free network resources doesn't allocate those resources, it simply passes the request further up along the priority chain (FIG. 25). In this example, manager_1 forwards 192 the freeing request to manager_2. Manager_2 frees and confirms 189 to manager_3.

FIG. 26 shows a first strategy for freeing spread resources. Manager_3 153 requests a network resource to be set free. Manager_1 151 allocates 20% of the requested resource and sets it free. The remaining request is forwarded 192 to manager_2. Since manager_2 does not allocate anything of this resource, it forwards 192 the request upwards. Since there is still not enough of the requested network resource, manager_3 fails to start its application. Thus manager_1 has set free the allocated resources unnecessarily.

FIG. 27 shows an improved strategy for freeing spread resources. Manager_3 requests a network resource from manager_1. Manager_1 only holds 20% of this resource and sets it free by releasing its connections. The remaining 80% it requests from manager_2 by forwarding 192 a changed freeing request. Manager(2) would have 100% of the requested resource. To provide the remaining 80% it has to release all its connections. Then it confirms to manager_3. In best case, manager_1 would have continued undisturbed, since it would have been enough, if manager_2 had given its resources to manager_3.

Figure 28:
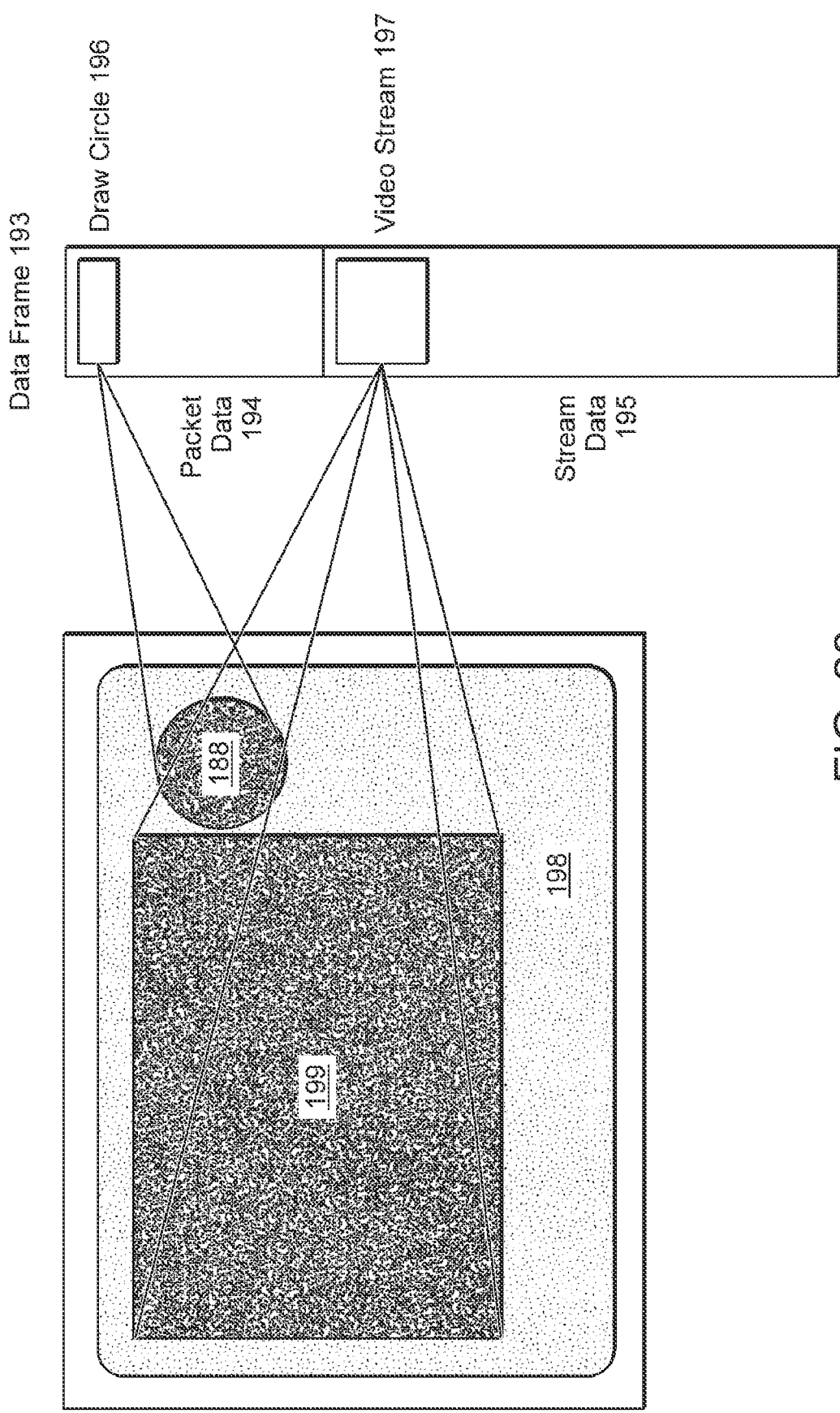
FIG. 28 shows display receiving graphical data via different paths.

FIG. 28 shows a display receiving graphical data via different paths. The exemplary data frame 193 received from the network contains two types of information for the display:

(1) a graphical command 196 to reproduce a circle 188. A graphical command is transmitted only once in a packet 194. Therefore graphical commands will usually consume only a few bytes on the network; and (2) Video data is transmitted in a compressed stream 197, like MPEG2. A synchronous channel is used for transmission. With each data frame 195, a portion of the stream is received. The stream is decoded by the display's video decoder and rendered to the corresponding video port. In case of an embedded solution, the decoder could be a chip. If a PC is used as a display, a software decoder could be used.

FIG. 29 shows alphanumerical representation of data on a display. An alphanumeric HMI can create an alphanumeric representation from a descriptor, showing a simple menu and the values in form of text and numbers. The interaction could be done using some buttons which are located below the HMI's display. In this example, a user can select from the sources: none, which means that no source is connected, CD player, Tuner, and iPod®. Additionally, the volume can be set in the form of a two digit number.

FIG. 30 shows a graphical representation of data in a display. A graphical display could create a more complex representation, where the volume or other parameters could be changed by a slider control. In this case the interaction could be effected with a mouse or a touch panel.

FIG. 31 shows a simple HMI without a display. This HMI has two buttons, one with an up arrow and one with a down arrow, and two more buttons, one with a '+' sign and the other with a '−' sign. Even an HMI without any display and comprising only some buttons would still be enough for selecting an audio source and for setting the volume.

FIG. 32 shows examples of differently equipped HMIs. Each HMI has at least a descriptor 200. Some very simple HMIs 220 like remote controls, alphanumerical HMIs, or sensing devices need only such a descriptor. Other HMIs 221 like television sets (TV) or set top boxes (STB) would have an additional video sink 201. Mobile phones or PDAs might have an additional script sink 202 and a picture sink 203 in addition to their descriptor. PCs, high-end STBs, or game consoles 223 may have additional video sinks/sources 201 and command sinks/sources 204.

Figure 33:
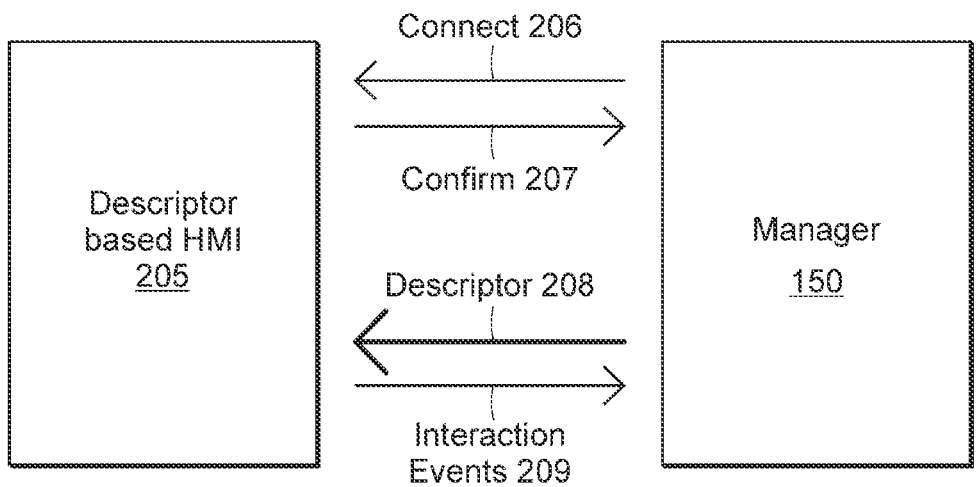
FIG. 33 shows dataflow between manager and a descriptor based HMI.

FIG. 33 shows dataflow between a manager and a descriptor based HMI. A manager 150 can connect 206 to a descriptor based HMI 205. This connection will be confirmed 207 by the HMI. Then the manager supplies a descriptor 208 to the HMI. When the HMI starts representing the descriptor, and the HMI or a user interacts, the corresponding events 209 are sent to the manager.

FIG. 34 shows a manager 150 accessing an HMI 139. A device manger is also a possible source, if it wants to offer the user the possibility of interaction to control the manager's application.

Figure 35A:
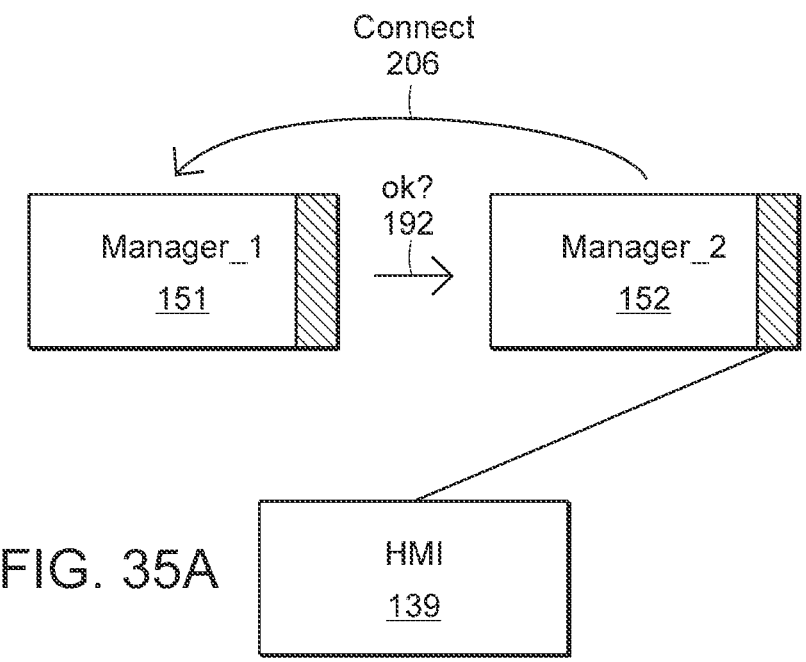
FIG. 35 shows managers in competition for an HMI.
Figure 35B:
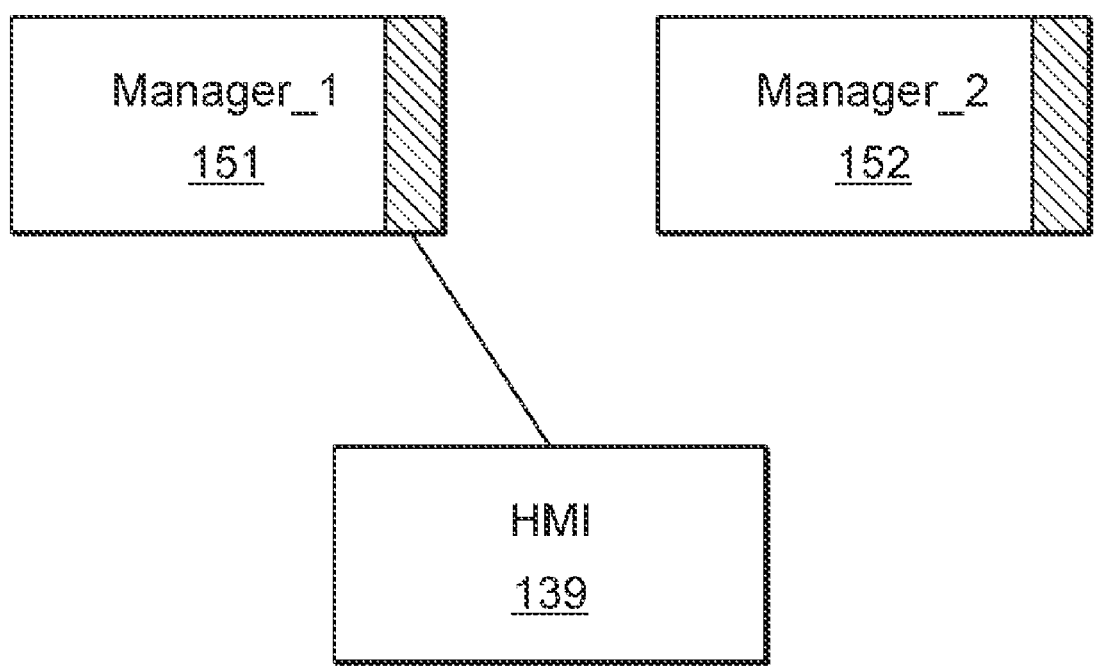

FIG. 35 shows two managers in competition for an HMI. Manager_1 151 has a lower priority level than manager_2 152. If manager_1 requests a connection to the HMI 139, it has to make a connection request 192 to manager_2 (FIG. 35a). Once the request is granted 206, manager_1 connects (FIG. 35b). This connection procedure ensures that an application with a low priority level will obtain access to the display only when the HMI is not currently needed by a more important application.

If a manager has function related HMIs, it will connect to them during system startup. Which HMIs are related, is part of the manager's configuration. This configuration has to be established at installation time.

FIG. 36 shows a change of a descriptor during a request for a connection to an HMI. It is assumed that the owner of a house does not want the children to listen to music having a higher volume than 80% of the amplifier's maximum power. He will accordingly configure his profiler application which runs on his server. Whenever the AV selector 164 in the children's room connects to the HMI, the profiler 171 will change the AV selector's descriptor from

```
{
    var enum source
        range { none, CD, tuner, iPod }
        value { tuner }
    var uint volume
        range { 0,255 }
        steps { 1 }
        value { 80 }
}
to
{
    var enum source
        range { none, CD, tuner, iPod }
        value { tuner }
    var uint volume
        range { 0,204 }
        steps { 1 }
        value { 80 }
}
```

Now the maximum volume which can be selected on the children's HMI is 80% of the possible maximum.

FIG. 37 shows the application 367 of HMI 139 to select intercom 362 for interaction. This is the first of two states. At first, the HMI 367 is connected 213 to the HMI's sinks or sources 141. It offers a menu from which the user selected the intercom. So the HMI's manager informs the intercom's manager to connect to the HMI.

FIG. 38 shows the second state, where the intercom's manager is connected 213 to the HMI's sinks or sources 141.

FIG. 39 shows an HMI with multiple sinks in a STB 126. Descriptor_based_HMI 205 accepts 213 representation descriptors; the other, video_sink 140, accepts video stream data 216. In the example, the application AV_select 364 for selecting an AV source 127 is currently connected to the representation sink. To start streaming, it connects 214, 215 the video sink with the video source.

Figure 40:
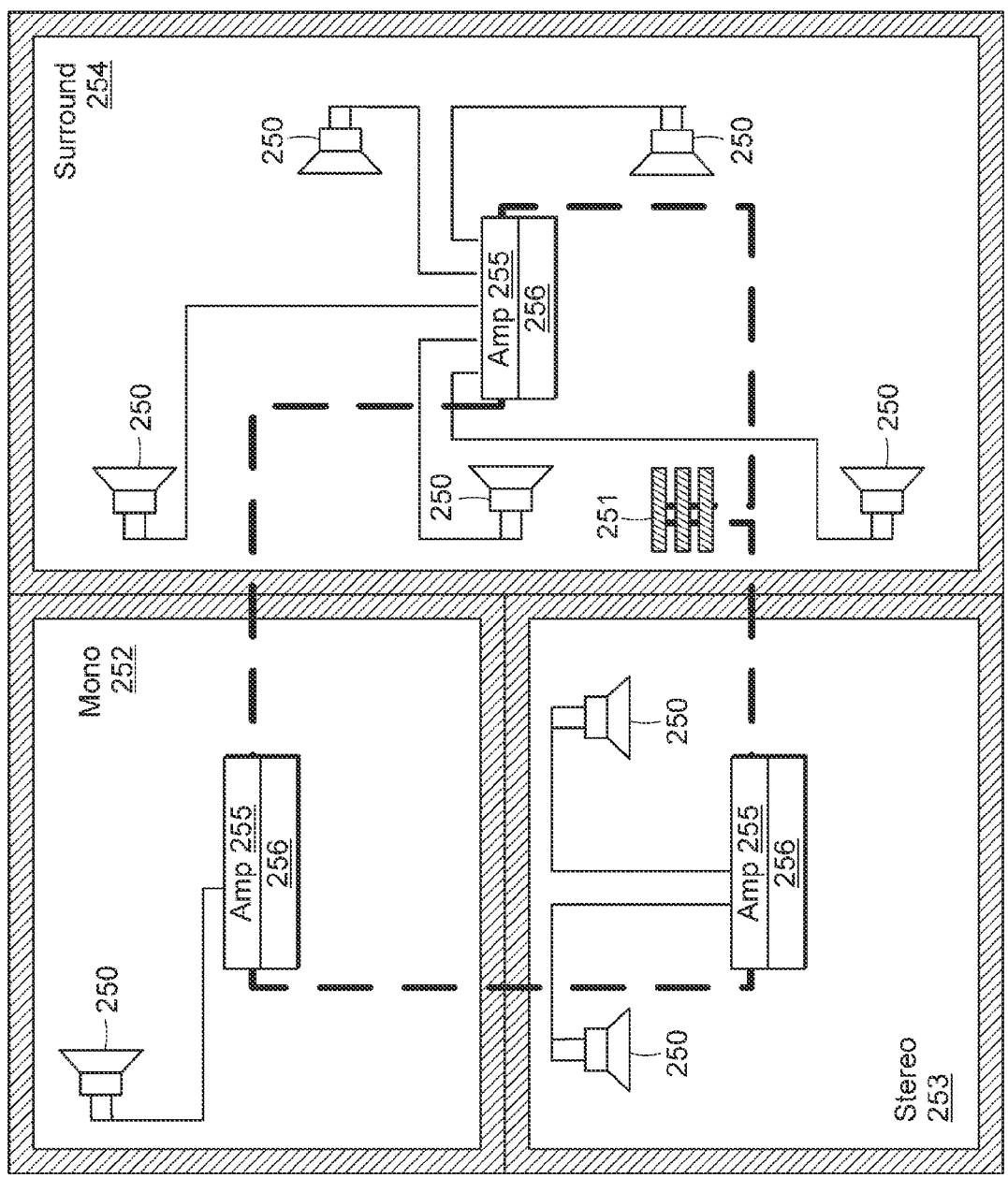
FIG. 40 shows a network with amplifier and passive speakers.

FIG. 40 shows a network with amplifiers 255 and passive loudspeakers 250. This network is part of a scenario demonstrating the inventive concept. It comprises a home which has an installed high-end audio system. No other network devices are installed yet, but of course the system should be expandable in the future. There are three differently equipped rooms, one with only a single loudspeaker (Mono) 252, one with two loudspeakers (Stereo) 253, and one room with five speakers (Surround) 254. Assumed is a multitude of audio sources 251 which could supply audio streams that differ in terms of encoding, number of channels, sample width, sample rate, etc.

Naturally there are many possible setups for putting into practice a system of this kind. The most important ones are shown.

In the first setup there is an amplifier 255 in each room. Passive loudspeakers are connected to the amplifier via copper wires (straight lines). Localization of the speakers is finally effected when they are connected to the amplifier. The HMI 256 for controlling the amplifier 255 is part of the device. Thus, in this interaction model the HMI is device based. Now each amplifier scans the network (dashed lines) for active audio streams which can be decoded. The result of this query is offered to a user through the proprietary HMI. Once the user selects one of these streams, the amplifier reproduces it.

Figure 41:
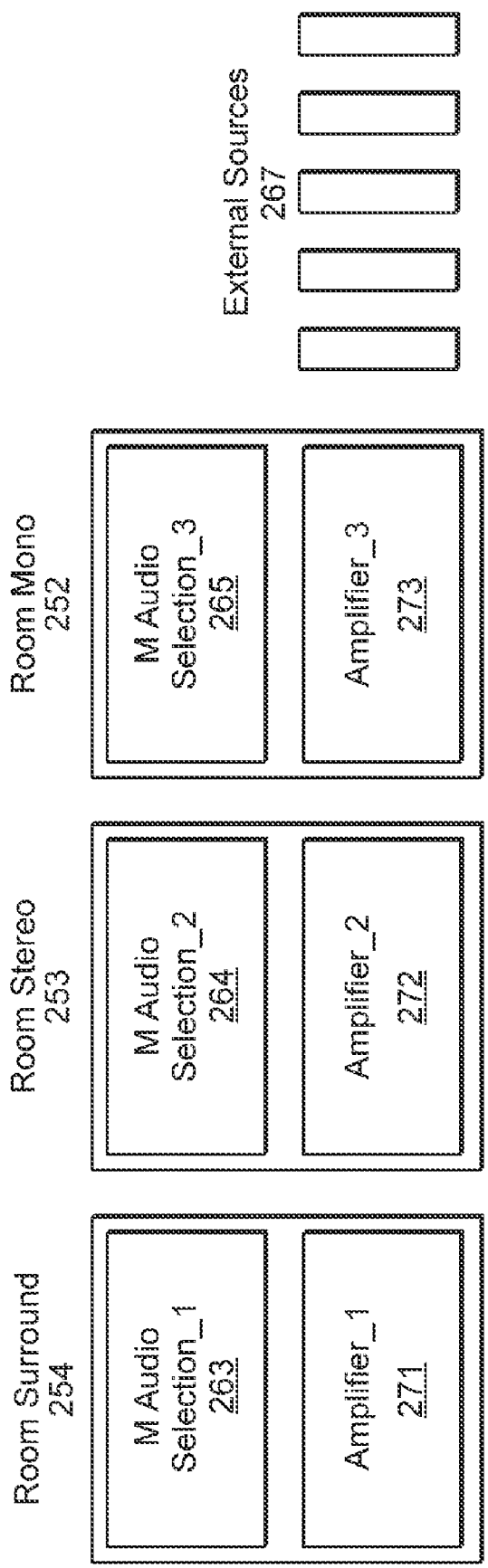
FIG. 41 shows a model of a network with amplifier and passive speakers.

FIG. 41 shows a model of a network with amplifier and passive loudspeakers as in the previous Figure. There are three amplifiers, i.e. amplifier_1 271 to amplifier_3 273. The HMI of each amplifier remains invisible to the network since it is device based. Only two function blocks per amplifier are exported. The audio selection function block (audio selection_1, audio selection_2, audio selection_3) is an application manager. It scans the network for all appropriate sources which can be connected to the local sink. The sink is exported to the network by the amplifier function block (amplifier_1 271, amplifier_2 272, amplifier_3 273). As long as no other manager of higher priority level is in the system, the audio selection managers can connect any available source without any reservations.

Figure 42:
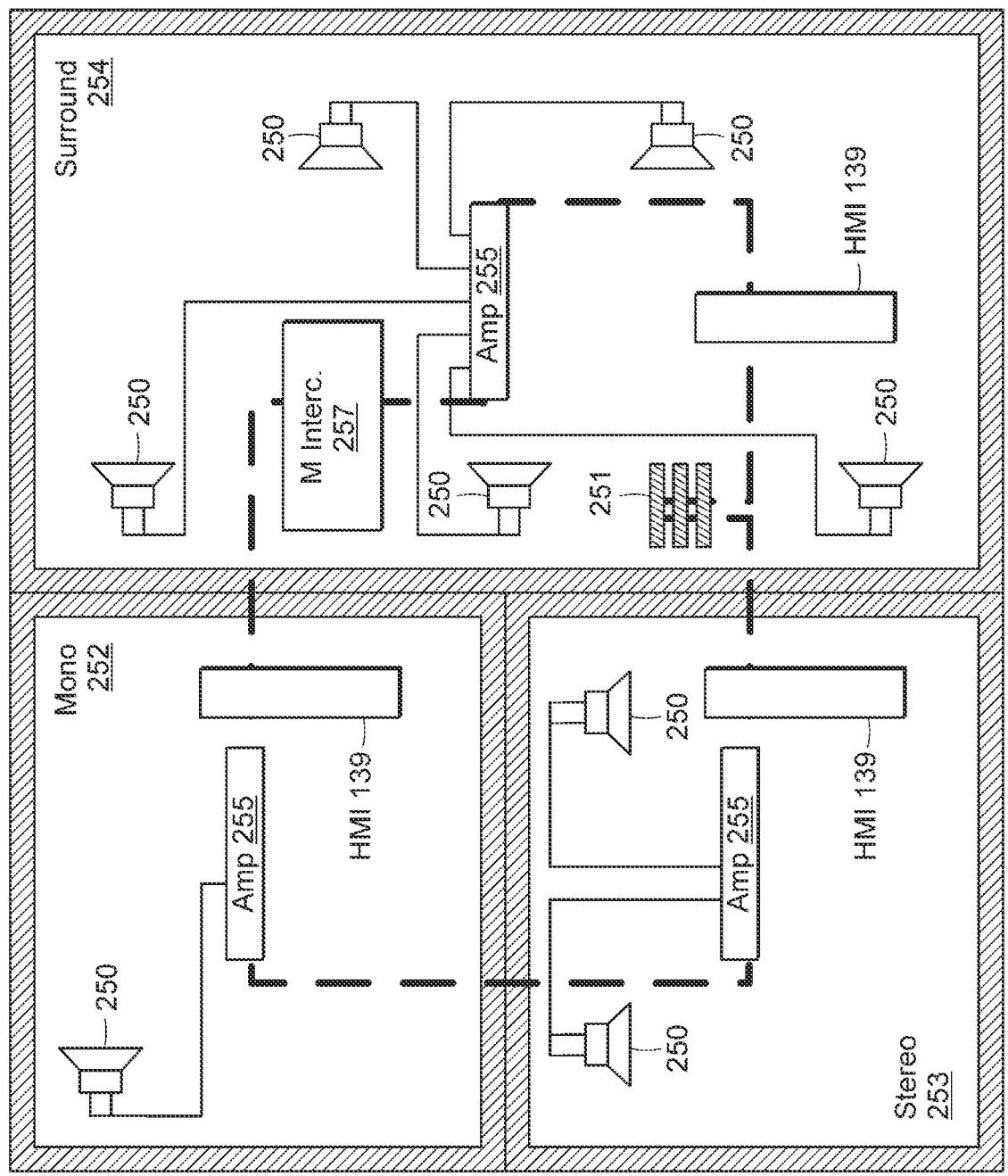
FIG. 42 shows a network with amplifier, passive speakers and HMI.

FIG. 42 shows a network with amplifiers 255, passive speakers 250 and HMIs 139. This is the previous setup, but is enhanced by one central intercom device 257 and one microphone plus HMI for each room. It is assumed that the HMI is just a button. When pressed, all other rooms are paged.

Figure 43:
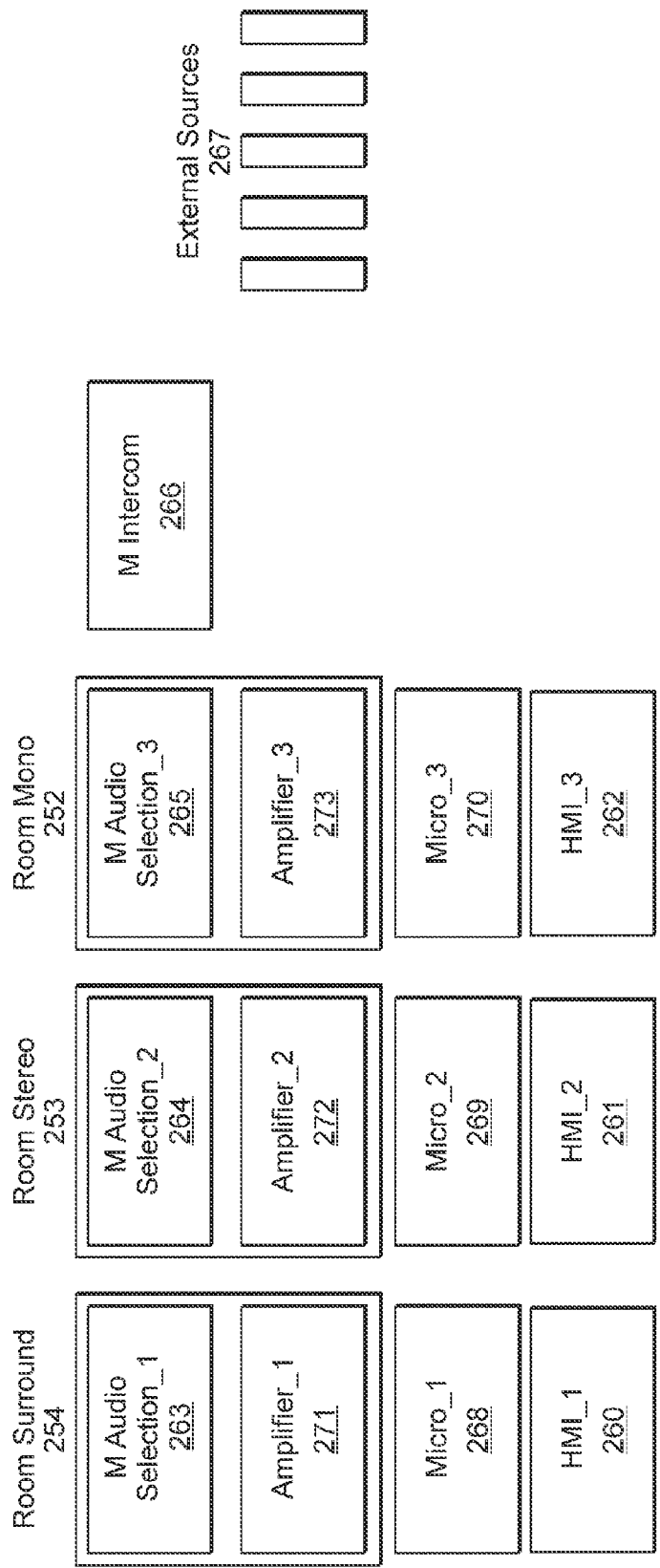
FIG. 43 shows a model of a network with amplifier, passive speakers and HMI.

FIG. 43 shows a model of a network with an amplifier, passive speakers, and an HMI as in the previous Figure. For each room's microphone there is a microphone function block (micro_1 268, micro_2 269, micro_3 270) and an HMI function block (HMI_1 260, HMI_2 261. HMI_3 262). The configuration is set up during installation of the intercom. Three rooms are defined, and the associated devices are grouped. Each intercom group consists of an amplifier, a microphone, and a function related HMI. Whenever the system starts up, the intercom connects itself automatically to each HMI.

Assuming that a user is listening to music in one or more rooms, and a caller presses an intercom button in another room, then the HMI will send a corresponding notification message. The intercom's manager then tries to connect the paged room's amplifiers to the caller's microphone. As there is no manager with a higher priority level, this can be done immediately. If a user in one of the paged rooms uses the hardware-related HMI to operate the amplifier whilst the intercom is active, the amplifier's audio selection manager will request connection of the amplifier to the selected source from the intercom manager of higher priority level. Since the intercom manager knows that there is an active intercom connection, it will refuse the request. Thus the intercom is not interfered with, which is exactly what is wanted.

Figure 44:
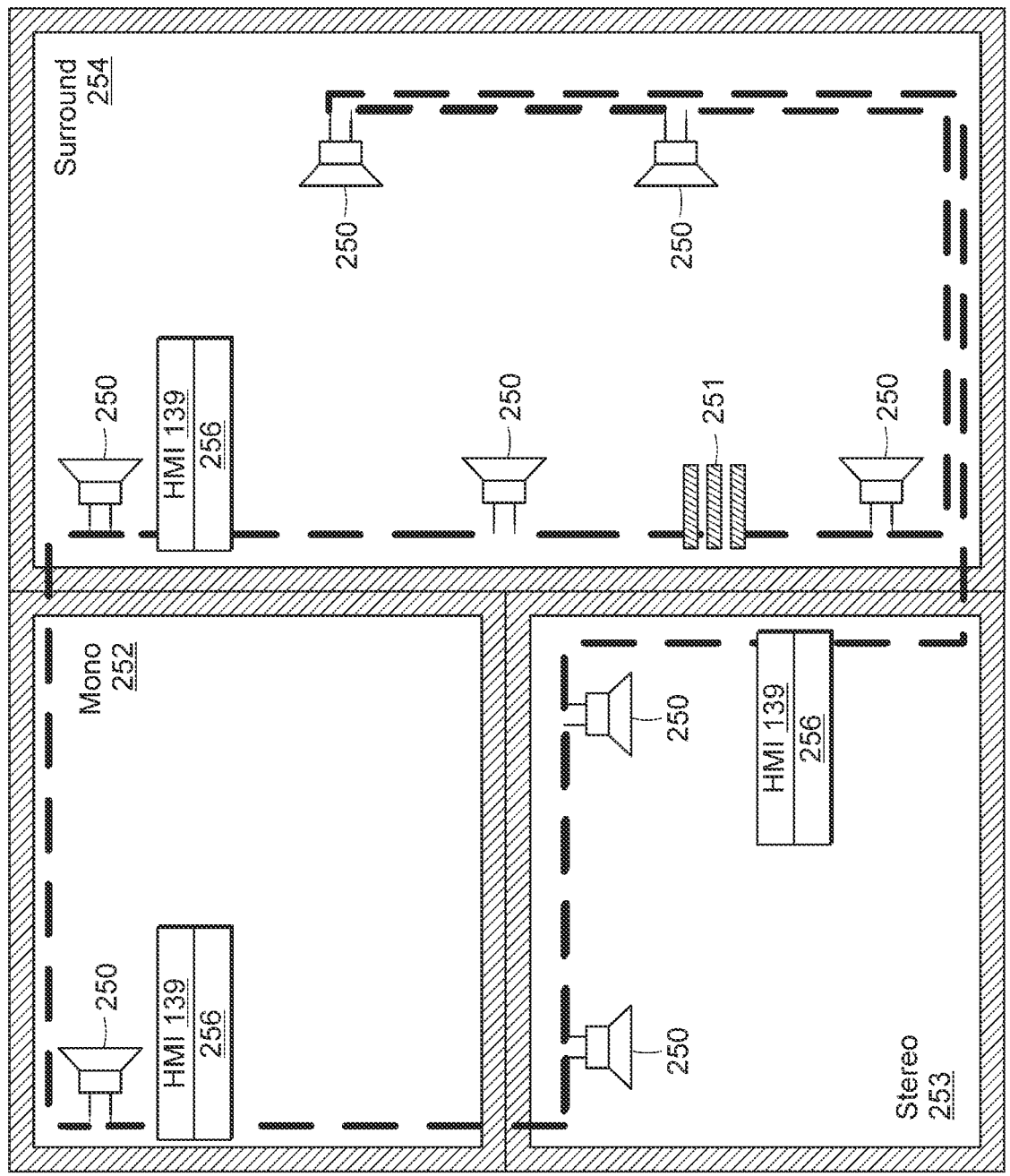
FIG. 44 shows a network with active speakers.

FIG. 44 shows a network with active loudspeakers, based on the previous setup, but with different hardware components. Now active loudspeakers 250 are used. They are connected directly to the network (dashed line). No copper wiring for analog audio is needed. As HMI there is an independent device 139 in each room. It consists of an alphanumeric display and a few buttons.

Figure 45:
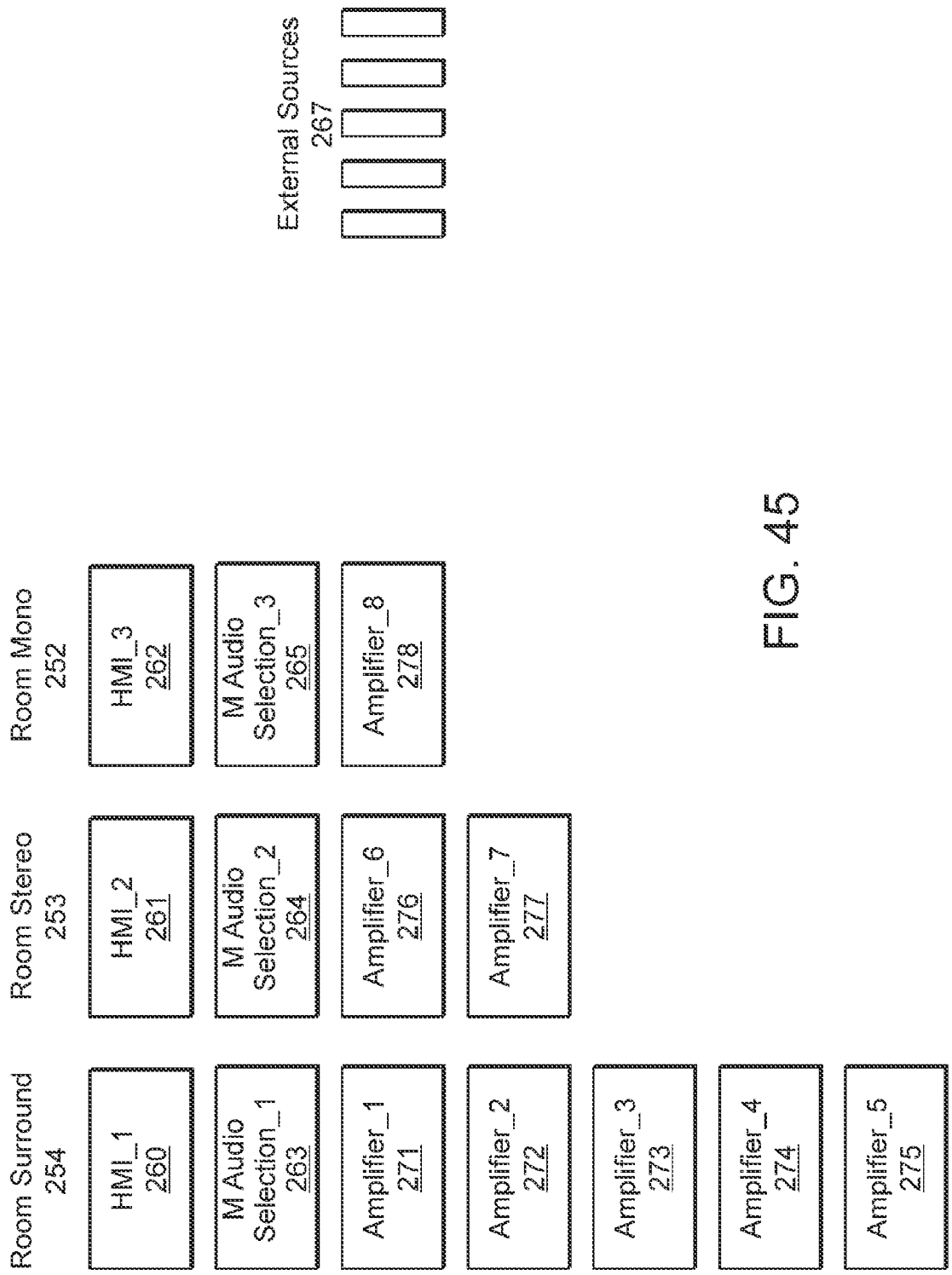
FIG. 45 shows a model of a network with active speakers.

FIG. 45 shows a model of a network with active loudspeakers according to the previous Figure. The device also contains the invisible software for performing audio selection. During installation, the localization is effected on each HMI device. For audio selection, the relevant loudspeakers and their positions are as previously indicated.

Since all devices are now network devices, there are many more function blocks within the system's model. In addition to the function blocks for the audio sources, there is one amplifier function block for each loudspeaker. Each HMI device exports two function blocks, one for the HMI and one for the audio selection.

Again each audio selection manager scans the network for available devices and offers the result through its HMI. Depending on loudspeaker capabilities, it also offers menu items for adjusting balance, performing equalization, etc.

Since every audio selection manager tries to connect only to the HMI of its devices, there is no competition for the HMIs as sinks.

Figure 46:
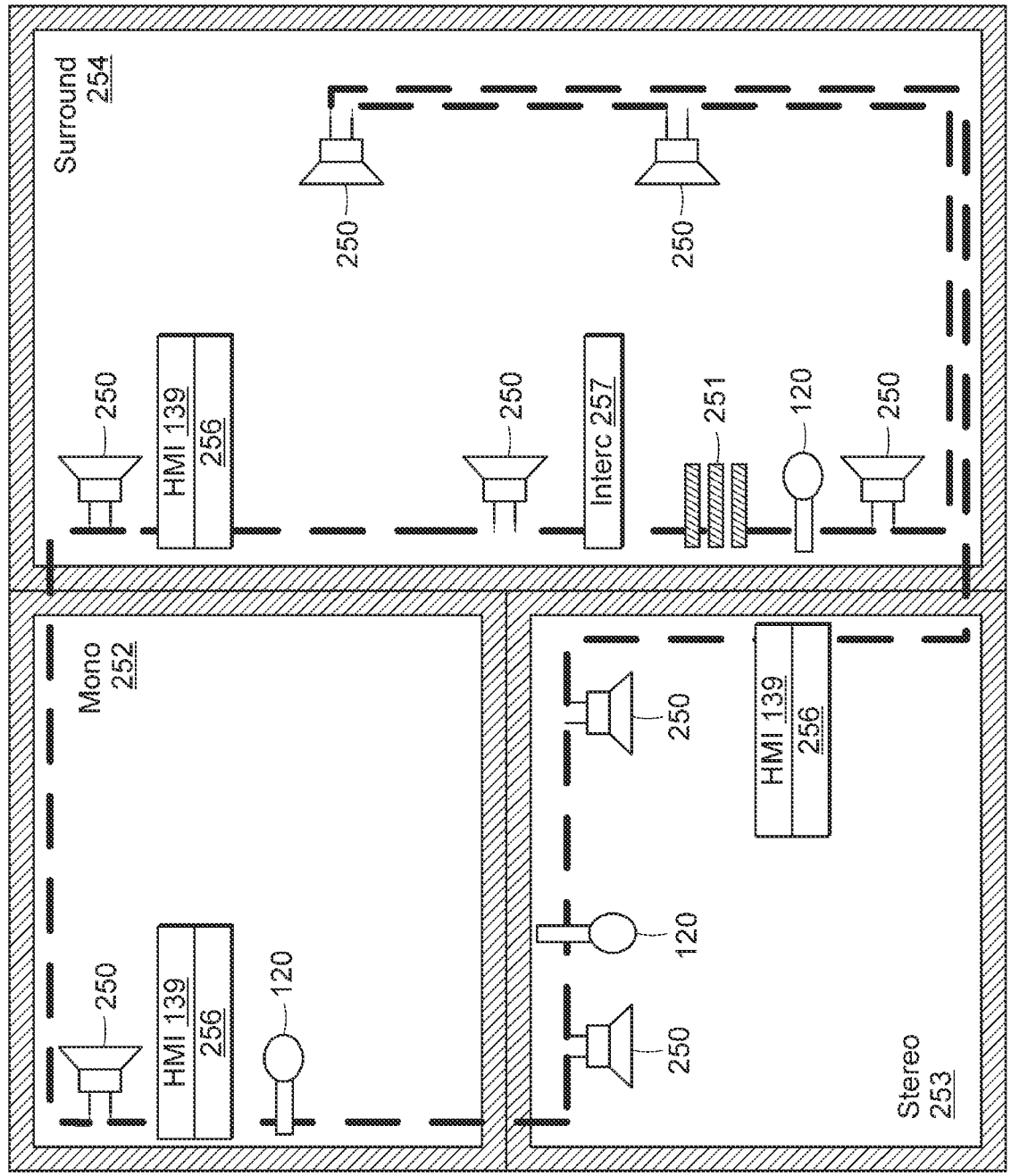
FIG. 46 shows a network with added microphones.

FIG. 46 shows a network based on the previous setup, but with a microphone added to each room. Once the intercom device is installed, the setup utility becomes visible on an already installed display. This happens as follows: By default setting, the priority level of the intercom is higher than that of the audio selection. Thus the intercom can connect the display whenever it wishes. During setup of the intercom, a user will group devices in intercom rooms.

Figure 47:
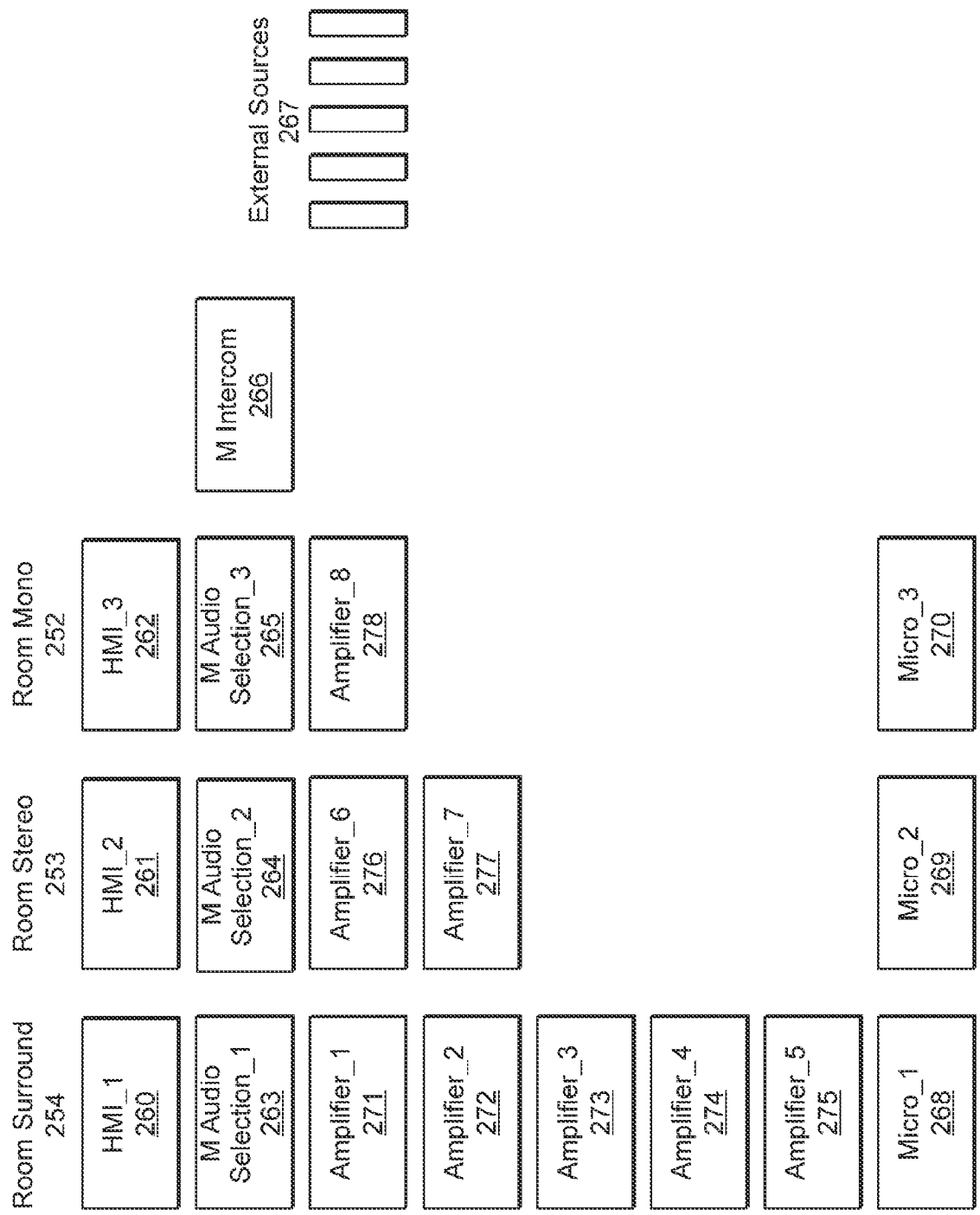
FIG. 47 shows a model of a network with added microphones.

FIG. 47 shows a model of the network of the previous Figure. Each room has an additional microphone function block. In addition to this, one manager for the intercom has been added. The connection of sources and sinks is effected as in the previous example. Since the intercom has a higher priority level, it can always connect whatever it wants. The audio selection manager now has to make a connection request to the intercom manager before connecting. Since the HMI also offers a small display, many more intercom actions become possible, such as a room to room connection, and listening-in to a room (baby phone).

The invention claimed is:

1. A digital network for communication between a plurality of devices, comprising:
   at least one device having a source for transmitting data into the network;
   at least one device having a sink for receiving data from the network;
   at least one device having an application for at least one of communicating with and controlling any other device or application;
   wherein data is transferred from sources to sinks only by means of connections between sources and sinks;
   wherein at least one application has a manager for management of devices, the manager being configured for:
      selecting at least one source and at least one sink to be connected; and
      connecting at least one selected source to at least one selected sink;
   wherein each of all managers have a unique assigned priority; and
   wherein at least one manager is configured for negotiating with other managers having a higher priority and requesting a right to specifically connect selected sources and sinks, and for limiting a selection of sources and sinks specifically to sources and sinks for which a connection has been granted by the other managers having a higher priority, before connecting at least one selected source to at least one selected sink, or controlling at least one selected source or at least one selected sink.

2. The digital network according claim 1, wherein at least one manager is configured for:
   querying for available sources and sinks on the network; and
   retrieving status information from selected devices.

3. The digital network according to claim 1, wherein at least one manager is configured for further limiting its selection in accordance with a limitation of a grant of network bandwidth made by at least one other manager.

4. The digital network according to claim 1, wherein at least one manager is configured for negotiating with all other managers having a higher priority.

5. The digital network according to claim 1, wherein at least one manager has:
   means for identifying a manager having a lowest priority;
   means for identifying a manager having a highest priority;
   means for querying all managers in a chain in an order of their priorities, starting with a highest priority or a lowest priority or a priority of a specified manager; and
   means for accessing sinks or sources only after querying all managers having a higher priority for grant of access to these sinks or sources.

6. The digital network according to claim 1, wherein at least one negotiation administrator is provided for assigning to selected managers a right to connect selected sources to selected sinks, and wherein at least one manager is configured for requesting a right to connect sources and sinks from the at least one negotiation administrator, before connecting at least one selected source to at least one selected sink, or controlling the at least one selected source and sink, and this manager is further configured to return the right to connect sources and sinks to the at least one negotiation administrator.

7. The digital network according to claim 6, wherein at least one manager is configured to act as a negotiation administrator.

8. The digital network according to claim 7, wherein the at least one manager configured to act as a negotiation administrator is a manager having the highest assigned priority in the network.

9. The digital network according to claim 1, wherein at least one manager, upon information received from at least one other manager, is configured for at least one of:
   adding at least one sink;
   adding at least one source; and/or
   chaining-in at least one additional device.

10. The digital network according claim 1, wherein at least one manager is configured for publishing an established connection to managers having a lower priority, after having received a grant for the connection, or having connected at least one source and at least one sink.

11. The digital network according to claim 1, wherein at least one of a virtual source and a virtual sink is provided for a device which does not have a source or a sink for connection to other devices.

12. The digital network according to claim 1, wherein at least one manager is configured for releasing a connection by:
    sending a release request to a manager having highest priority, from where the request is passed down to other managers in an order of decreasing priority, with each device manager marking sources and sinks that continue to be required; and
    de-allocating all unmarked sources and sinks.

13. The digital network according to claim 1, wherein at least one device has a profiler for conforming requests to previously defined profiles.

14. The digital network according to claim 1, wherein at least one garbage collection manager is provided for releasing unused connections.

15. The digital network according to claim 14, wherein the garbage collection manager has the lowest priority in the network.

16. The digital network according to claim 14, wherein the garbage collection manager is configured to send connection release requests to all connected resources.

17. The digital network according to claim 1, wherein at least one human machine interface (HMI) is provided with descriptor based access.

18. The digital network according to claim 1, wherein at least one means for tunneling frames of a different network type is provided, the means containing function blocks of an alternative network source and an alternative network sink.

19. The digital network according to claim 1, wherein at least one manager is configured for finding a free group address for groupcast by:
    generating a group address that is estimated to be free;
    requesting this address from other managers in an order of increasing priority;
    assigning a group address to sources and sinks after a manager having a highest priority has confirmed the address; and
    staffing again by generating another group address and requesting this another group address from other managers, or aborting a finding operation in case any manager has rejected the request.

20. A method for freeing network resources required for establishing a new connection between a data source and a data sink in a decentralized digital network for communication between a plurality of devices, the network comprising:
    at least one device having a source for transmitting data into the network;
    at least one device having a sink for receiving data from the network;
    connections for data transfer between sources and sinks;
    device managers which each have an assigned priority and are interconnected along a priority chain, for selecting, connecting, and controlling specific sources and sinks for which an establishment of a connection has been granted by other managers having a higher priority;
the method comprising the steps of:
    selecting a device manager to establish a new connection between a source and a sink, and using the selected manager as a calling manager to send first to a manager of lowest priority in the priority chain a freeing request for required network resources in case the selected device manager does not have resources necessary for establishing the new connection, the freeing request containing a "don't free parts" flag telling receiving managers not to free any resources in case they cannot grant all requested resources;
    using a receiving manager to pass the freeing request to a receiving manager of next higher priority, in case it cannot grant all requested resources;
    using a receiving manager to free all requested resources and confirm availability of the resources to the calling manager, in case this receiving manager can grant all requested resources;
    using a receiving manager to enter details of a partial amount that this manager could contribute to the requested resources in a "spread resource found" field reserved for this purpose in the freeing request, without freeing any resources, in case this receiving manager cannot grant all requested resources and the "don't free parts" flag is set, before passing the request to a receiving manager of next higher priority;
    using a receiving manager to remove the "don't free parts" flag from the request and to pass the request back to the receiving manager having a lowest priority, in case the total of partial amounts entered has reached 100% of an initially requested amount;
    using the calling manager to cancel the initially intended establishment of a connection in case the freeing request passed upwards along the priority chain returns to the calling manager and subordinate managers along the priority chain were not able to contribute a total initially requested amount of resources; and
    using a manager receiving the freeing request with the "don't free flag" not set after it has been passed back to the manager of lowest priority to check whether a total of partial amounts entered in the "spread resource found" field minus the partial amount that this manager could contribute is above or equal to 100% of a total amount initially requested, and if it is, to pass the request to a manager of next higher priority without freeing any resources, and if it is not, to free the partial amount of resources that this manager had entered as being able to contribute, and to subtract the partial amount of freed resources from the requested amount, and to pass the request, if it is not completely fulfilled, to the manager of next higher priority along the chain.

21. The method according to claim 20, wherein the freeing request comprises the following information fields:
    type of resource requested to be freed;
    amount of source to be freed;
    a "don't free parts" flag;
    a "spread resource found" field; and
    a "spread resource freed" field.

22. A method for freeing network resources required for establishing a new connection between a data source and a data sink in a decentralized digital network for communication between a plurality of devices, the network comprising:
    at least one device having a source for transmitting data into the network;
    at least one device having a sink for receiving data from the network;
    connections for data transfer between sources and sinks;
    device managers which each have an assigned priority and are interconnected along a priority chain, for selecting, connecting, and controlling specific sources and sinks for which an establishment of a connection has been granted by other managers having a higher priority;
the method comprising the steps of:
    using a selected device manager as a calling manager to send to a manager of lowest priority in the priority chain a freeing request for required network resources, the freeing request containing a "don't free parts" flag telling receiving managers not to free any resources in case they cannot grant all requested resources;

using a receiving manager which can cover the whole request to free all requested resources and confirm availability to the calling manager;

using a receiving manager which cannot cover the whole request when the "don't free parts" flag is set to add an amount it could contribute to a "spread resource found" field reserved for this purpose in the freeing request, and to remove the "don't free parts" flag if the "spread resource found" field reaches 100%, and to pass the request back to the manager with the lowest priority;

using the calling manager to cancel connecting when the subordinate managers do not have the requested amount of the resource to free and the request returns to the calling manager;

using a receiving manager which receives the freeing request with the "don't free parts" flag not set to check whether the "spread resource found" field minus its own part is above or equal to 100%, and if it is, to pass the request to a manager of next higher priority without freeing any resources, and if it is not, to free its allocated resources, remove the freed part from the requested amount and pass the request upwards if it is not completely fulfilled.

23. The method according to claim 22, wherein the freeing request comprises the following information fields:

type of resource requested to be freed;

amount of source to be freed;

a "don't free parts" flag;

a "spread resource found" field; and a "spread resource freed" field.

24. A manager for a digital network for communication between a plurality of devices, wherein the manager has an assigned priority and is configured for:

assigning a unique priority to each manager;

querying for available sources for transmitting data into the network, and sinks for receiving data from the network;

retrieving status information from selected devices;

selecting at least one source and at least one sink to be connected;

negotiating with other managers having a higher priority, and requesting the right to specifically connect selected sources and sinks;

limiting a selection of sources and sinks specifically to sources and sinks for which a connection has been granted by the other managers; and connecting at least one selected source to at least one selected sink.

25. A method for managing network devices in networks for communication between a plurality of devices, comprising the steps of:

assigning a unique priority to each of all managers;

using at least one manager to query in the network for available sources for transmitting data into the network, and sinks for receiving data from the network;

using at least one manager to retrieve status information from selected devices;

using one or a plurality of managers to select at least one source and at least one sink to be connected;

using one or a plurality of managers to connect at least one selected source to at least one selected sink;

using at least one manager to negotiate with other managers having a higher priority and to request the right to connect specifically selected sources and sinks;

using at least one manager to limit the selection of sources and sinks specifically to sources and sinks for which a connection has been granted by at least one negotiation administrator; and using at least one manager to connect at least one selected source to at least one selected sink.

26. The method according to claim 25, comprising a further step of using a manager to request a right to negotiate with other managers from at least one negotiation administrator, before negotiating with other managers.

27. The method according to claim 25, comprising a further step of using at least one garbage collection manager to release unused connections.

28. The method according to claim 27, comprising a further step of assigning a lowest priority in the network to the at least one garbage collection manager.

* * * * *

UNITED STATES PATENT AND TRADEMARK OFFICE
CERTIFICATE OF CORRECTION

| | |
|---|---|
| PATENT NO. | : 7,701,959 B2 |
| APPLICATION NO. | : 11/831388 |
| DATED | : April 20, 2010 |
| INVENTOR(S) | : Hetzel et al. |

It is certified that error appears in the above-identified patent and that said Letters Patent is hereby corrected as shown below:

IN THE CLAIMS:

Claim 19 at col. 27, line 38: delete "staffing" and replace with --starting--.

Signed and Sealed this

Twenty-fourth Day of August, 2010

David J. Kappos
*Director of the United States Patent and Trademark Office*